US012253824B2

(12) United States Patent
Nakayama et al.

(10) Patent No.: US 12,253,824 B2
(45) Date of Patent: Mar. 18, 2025

(54) TONER

(71) Applicant: CANON KABUSHIKI KAISHA, Tokyo (JP)

(72) Inventors: Kenichi Nakayama, Shizuoka (JP); Naoya Isono, Shizuoka (JP); Yoshiaki Shiotari, Shizuoka (JP); Hirofumi Kyuushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 17/466,306

(22) Filed: Sep. 3, 2021

(65) Prior Publication Data

US 2022/0075284 A1 Mar. 10, 2022

(30) Foreign Application Priority Data

Sep. 10, 2020 (JP) ................................ 2020-152278

(51) Int. Cl.
*G03G 9/097* (2006.01)
*G03G 9/08* (2006.01)
*G03G 9/093* (2006.01)

(52) U.S. Cl.
CPC ....... *G03G 9/09725* (2013.01); *G03G 9/0819* (2013.01); *G03G 9/0825* (2013.01); *G03G 9/09321* (2013.01); *G03G 9/09328* (2013.01); *G03G 9/09364* (2013.01); *G03G 9/09371* (2013.01)

(58) Field of Classification Search
CPC ............ G03G 9/09725; G03G 9/0819; G03G 9/0825; G03G 9/09321; G03G 9/09328; G03G 9/09364; G03G 9/09371
See application file for complete search history.

(56) References Cited

U.S. PATENT DOCUMENTS

| | | | |
|---|---|---|---|
| 5,569,529 | A | 10/1996 | Becker et al. |
| 6,316,157 | B1 | 11/2001 | Yoshikawa et al. |
| 6,346,356 | B1 | 2/2002 | Ohno et al. |
| 7,112,393 | B2 | 9/2006 | Komoto et al. |
| 7,153,625 | B2 | 12/2006 | Kaburagi et al. |
| 7,241,546 | B2 | 7/2007 | Moriki et al. |

(Continued)

FOREIGN PATENT DOCUMENTS

| | | | |
|---|---|---|---|
| CN | 107430362 | A | 12/2017 |
| CN | 111381465 | A | 7/2020 |

(Continued)

OTHER PUBLICATIONS

English machine translation of the description of JP-2018049244-A (Year: 2018).*

(Continued)

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle and a silica particle on a surface of the toner particle, wherein an area formed by a polyester resin and an area formed by a styrene-acrylic resin are present on the surface of the toner particle; the silica particle has the number-average particle diameter of 15 to 60 nm; the silica particle has the average pore diameter of 5.0 to 20.0 nm; and the silica particle has the total pore volume of 0.20 to 1.50 $cm^3/g$.

5 Claims, 1 Drawing Sheet

(56) References Cited

U.S. PATENT DOCUMENTS

| | | | |
|---|---|---|---|
| 7,387,860 | B2 | 6/2008 | Moriki et al. |
| 7,846,631 | B2 | 12/2010 | Katsuta et al. |
| 8,288,069 | B2 | 10/2012 | Fujikawa et al. |
| 8,323,726 | B2 | 12/2012 | Naka et al. |
| 8,367,289 | B2 | 2/2013 | Isono et al. |
| 8,440,382 | B2 | 5/2013 | Isono et al. |
| 8,497,054 | B2 | 7/2013 | Sugiyama et al. |
| 8,652,737 | B2 | 2/2014 | Handa et al. |
| 8,778,581 | B2 | 7/2014 | Nonaka et al. |
| 8,822,120 | B2 | 9/2014 | Abe et al. |
| 8,828,639 | B2 | 9/2014 | Kamikura et al. |
| 8,841,056 | B2 | 9/2014 | Yoshizaki et al. |
| 8,986,914 | B2 | 3/2015 | Fujikawa et al. |
| 9,034,549 | B2 | 5/2015 | Shiotari et al. |
| 9,158,216 | B2 | 10/2015 | Shimano et al. |
| 9,256,148 | B2 | 2/2016 | Fujikawa et al. |
| 9,261,806 | B2 | 2/2016 | Moribe et al. |
| 9,285,697 | B2 | 3/2016 | Fukudome et al. |
| 9,377,705 | B2 | 6/2016 | Shimano et al. |
| 9,383,668 | B2 | 7/2016 | Noji et al. |
| 9,500,972 | B2 | 11/2016 | Tanaka et al. |
| 9,575,424 | B2 | 2/2017 | Nakagawa et al. |
| 9,594,323 | B2 | 3/2017 | Fujikawa et al. |
| 9,599,919 | B2 | 3/2017 | Isono et al. |
| 9,658,549 | B2 | 5/2017 | Tanaka et al. |
| 9,785,068 | B2 | 10/2017 | Umeda et al. |
| 9,785,071 | B2 | 10/2017 | Shimano et al. |
| 9,829,816 | B2 | 11/2017 | Tanaka et al. |
| 9,835,964 | B2 | 12/2017 | Yoshida et al. |
| 9,904,193 | B2 | 2/2018 | Nakagawa et al. |
| 9,921,501 | B2 | 3/2018 | Mochizuki et al. |
| 9,958,801 | B2 | 5/2018 | Tanaka et al. |
| 10,018,932 | B1 * | 7/2018 | Ojima ................ G03G 9/09342 |
| 10,031,433 | B2 | 7/2018 | Hoka et al. |
| 10,078,279 | B2 | 9/2018 | Nakagawa et al. |
| 10,101,681 | B2 | 10/2018 | Tagawa et al. |
| 10,216,107 | B2 | 2/2019 | Tsubaki et al. |
| 10,747,136 | B2 | 8/2020 | Kenmoku et al. |
| 10,948,839 | B2 | 3/2021 | Tsubaki et al. |
| 10,976,678 | B2 | 4/2021 | Yamawaki et al. |
| 11,086,242 | B2 | 8/2021 | Isono et al. |
| 11,112,710 | B2 | 9/2021 | Nakayama et al. |
| 11,112,714 | B2 | 9/2021 | Amano et al. |
| 2010/0035171 | A1 | 2/2010 | Watanabe et al. |
| 2017/0123333 | A1 | 5/2017 | Kuroki et al. |
| 2017/0255119 | A1 | 9/2017 | Hoka |
| 2017/0315459 | A1 | 11/2017 | Iguchi et al. |
| 2020/0363742 | A1 | 11/2020 | Kyuushima et al. |
| 2021/0311405 | A1 | 10/2021 | Shiotari et al. |
| 2021/0318631 | A1 | 10/2021 | Isono et al. |

FOREIGN PATENT DOCUMENTS

| | | | | |
|---|---|---|---|---|
| JP | 2008-224939 | A | | 9/2008 |
| JP | 2012-150172 | A | | 8/2012 |
| JP | 2013-3367 | A | | 1/2013 |
| JP | 2013003367 | A | * | 1/2013 |
| JP | 2016-80886 | A | | 5/2016 |
| JP | 2016080886 | A | * | 5/2016 |
| JP | 2017-156542 | A | | 9/2017 |
| JP | 2018-31867 | A | | 3/2018 |
| JP | 2018049244 | A | * | 3/2018 |
| JP | 2020-27276 | A | | 2/2020 |

OTHER PUBLICATIONS

English machine translation of the description of JP-2016080886-A (Year: 2016).*
English machine translation of the description of JP-2013003367-A (Year: 2013).*
U.S. Appl. No. 17/502,771, filed Oct. 15, 2021, Shohei Kototani.
U.S. Appl. No. 17/515,845, filed Nov. 1, 2021, Hirofumi Kyuushima.
U.S. Appl. No. 17/515,869, filed Nov. 1, 2021, Mai Kato.
Product Catalogue, Nippon Aerosil Co., Ltd., 10th edition (2023).

* cited by examiner

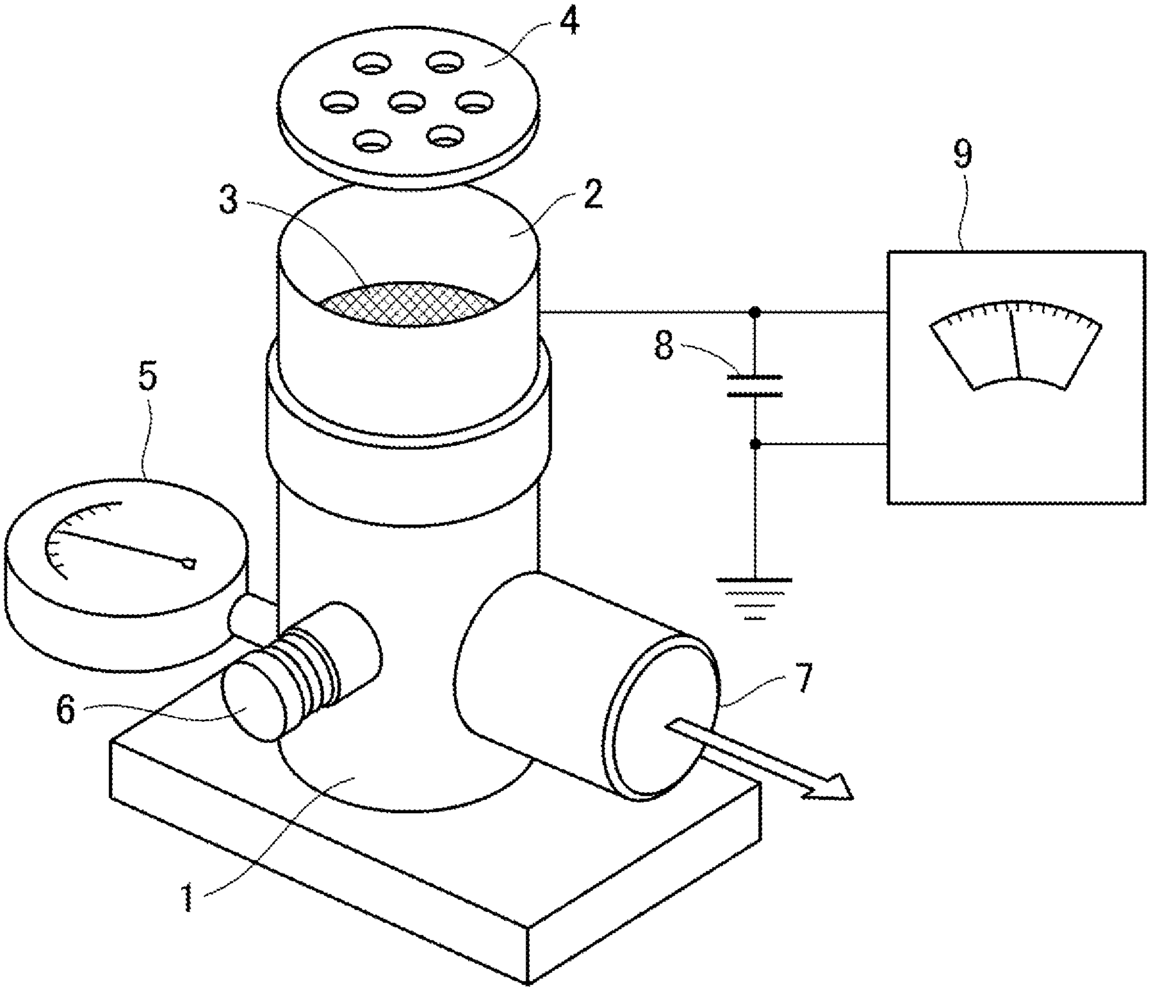
4
9
3
2
8
5
7
6
1

TONER

BACKGROUND OF THE INVENTION

Field of the Invention

The present disclosure relates to the toner used to form a toner image by the development of the electrostatic latent image formed by a method such as electrophotography, electrostatic recording, and toner jet system recording methods.

Description of the Related Art

The electrophotographic technology used in, e.g., receiving devices such as copiers, printers, and facsimile machines, has also been subjected year-to-year to increasingly severe requirements from users accompanying the increasingly widespread use of these devices. Due to a broadening of the use environments caused by a broadening of the market, the trend in recent years has been one of strong demand for obtaining a stable image quality regardless of the environment and strong demand for the ability to carry out printing on a long-term basis while using a compact design.

In order to satisfy these requirements, at the level of the electrophotographic process it is necessary during extended use that (1) there are no fluctuations in the developing performance and (2) the latent image is transferred onto the recording medium without perturbation. Due to this, at the toner level the charge quantity must not fluctuate during extended use, and a large number of refinements have been implemented in order to solve this problem.

Within the context of maintaining the physical property values of toner, an art is known in which a relatively large external additive, on the level of 100 nm, is added to toner in order to suppress deterioration during extended use via a spacer effect.

For example, an art for achieving additional enhancements in the durability is disclosed in Japanese Patent Application Laid-open No. 2013-003367. In this art, 50 nm to 150 nm monodisperse spherical particles are externally added to base particles having a styrene-acrylic-modified polyester resin disposed in a shell layer and separation is suppressed by providing a uniform attachment force between the externally added particles and the smoothened base particle surface.

SUMMARY OF THE INVENTION

However, while an improved durability is definitely recognized with this toner, it has been found that burying and detachment of the external additive particles proceed in the final stage of extended use and a decline in the externally added particles that function at the toner particle surface cannot be avoided, and that the problem thus arises of fluctuations in the charge quantity and a decline in the developing performance and transferability. This problem is observed to a substantial degree in particular during use in severe environments, i.e., high-temperature, high-humidity environments and low-temperature, low-humidity environments.

It was additionally found that fluctuations in the charge quantity are also produced in the case of transient increases in the amount of toner external additive in the developing apparatus during, e.g., continuous output of a high print percentage image, and that the problems then arise of a reduced stability for the image density and the occurrence of fogging.

That is, these problems can be attributed to the fact that there is still no art that maintains the charge quantity in the case of fluctuations in the amount of toner external additive in the developing apparatus due to extended use or due to the conditions of use. There is still desire—in order to provide the image quality stability required by the market—for toner that can maintain a certain or constant charge quantity.

The present disclosure provides a toner that, through an inhibition regardless of the use environment of the fluctuations in charge quantity associated with extended use, exhibits a suppression of fogging, an excellent density stability, and an excellent halftone quality and does so even during long-term printing.

A toner comprising a toner particle, and a silica particle on the surface of the toner particle, wherein an area formed by a polyester resin and an area formed by a styrene-acrylic resin are present on the surface of the toner particle;

the silica particle has the number-average particle diameter of 15 to 60 nm;

the silica particle has the average pore diameter of 5.0 to 20.0 nm; and the silica particle has the total pore volume of 0.20 to 1.50 $cm^3/g$.

The present disclosure can provide a toner that, through an inhibition regardless of the use environment of the fluctuations in charge quantity associated with extended use, exhibits a suppression of fogging, an excellent density stability, and an excellent halftone quality and does so even during long-term printing. Further features of the present invention will become apparent from the following description of exemplary embodiments with reference to the attached drawings.

BRIEF DESCRIPTION OF THE DRAWINGS

The FIGURE is a schematic drawing of an instrument for measuring charge quantity.

DESCRIPTION OF THE EMBODIMENTS

Unless specifically indicated otherwise, the expressions "from XX to YY" and "XX to YY" that show numerical value ranges refer in the present disclosure to numerical value ranges that include the lower limit and upper limit that are the end points. When numerical value ranges are provided in stages, the upper limits and lower limits of the individual numerical value ranges may be combined in any combination.

The present disclosure is specifically described in the following.

The present disclosure relates to a toner comprising a toner particle and a silica particle on the surface of the toner particle, wherein an area formed by a polyester resin and an area formed by a styrene-acrylic resin are present on the surface of the toner particle;

the silica particle has the number-average particle diameter of 15 to 60 nm;

the silica particle has the average pore diameter of 5.0 to 20.0 nm; and the silica particle has the total pore volume of 0.20 to 1.50 $cm^3/g$.

The silica particle is porous silica particle that have a prescribed average pore diameter and a prescribed total pore volume. The silica particle has a unique property such that the change in the charge quantity with respect to the amount of silica particle addition exhibits opposite tendencies depending on whether the toner particle surface is polyester resin or styrene-acrylic resin. When the toner particle surface is polyester resin, the absolute value of the charge quantity exhibits a declining trend when the amount of silica particle addition is increased; in contrast to this, the absolute value of the charge quantity exhibits an increasing trend when the toner particle surface is styrene-acrylic resin.

As a result of intensive investigations in order to exploit this property, it was discovered that—when said silica particles are added to a toner particle having at the toner particle surface an area formed by a polyester resin and an area formed by a styrene-acrylic resin—a charging buffering effect is exhibited whereby the charge quantity can be maintained approximately constant during extended use.

The following mechanism is hypothesized for the operation of the charging buffering effect.

With porous silica particles having the prescribed pore diameter, a tendency is seen whereby, regardless of the environment, water is retained in the pores due to the action of capillary phenomena and the action of residual silanol groups when residual silanol groups are present within the pores. In addition, polyester resin exhibits a higher water absorptivity than does styrene-acrylic resin.

Considering the scenario in which rubbing occurs at the toner particle surface with the silica particles in contact with polyester resin, since there is a high affinity between the polyester resin and the retained water in the silica particle pores, there is a tendency for the charge produced by triboelectric charging to leak via the retained water.

Considering, on the other hand, the scenario in which rubbing occurs at the toner particle surface with the silica particles in contact with styrene-acrylic resin, since the styrene-acrylic resin exhibits hydrophobicity, movement of the retained water in the pores is impeded and an accumulation effect operates for the rubbing-induced charge quantity.

It is hypothesized that when the resin segments having diametrically opposite charging tendencies versus the silica particles are both present at the toner particle surface, the overall charge quantity converges to and is maintained at an approximately constant value regardless of whether the amount of silica particles present at the toner particle surface is increased or decreased, and as a consequence a charge quantity buffering effect is in operation.

It is thus thought that a constant charge quantity will be maintained even when the amount of occurrence of silica particles of the toner surface in the developing device undergoes fluctuations during repetitive printing by the printer or copier, and that as a consequence a stable developing performance and a stable transferability can be realized during extended use and a longer life can be achieved for high-quality image output.

The silica particle is porous silica particle that contains pores and that has an average pore diameter of from 5.0 nm to 20.0 nm and a total pore volume of from 0.20 $cm^3/g$ to 1.50 $cm^3/g$.

The average pore diameter and the total pore volume are the values determined using the BJH method.

The total pore volume here is the total pore volume measured by the BJH method in the pore diameter range from 1.7 nm to 300.0 nm.

By having the average pore diameter of the silica particles be at least 5.0 nm, the retained water incorporated within the pores can readily undergo adsorption and desorption and the charge accumulation and leakage functionalities can be expressed in accordance with the resin type during contact and rubbing at the toner particle surface.

By having the average pore diameter be not more than 20.0 nm, the retained water incorporated in the pores can then be retained even in a low-temperature, low-humidity environment.

The average pore diameter of the silica particles is preferably from 7.0 nm to 15.0 nm.

Having the total pore volume of the silica particle be at least 0.20 $cm^3/g$ makes it possible to achieve an excellent expression of the charge quantity buffering function due to the retained water incorporated in the pores of the silica particles.

Having the total pore volume be not more than 1.50 $cm^3/g$ prevents the retained water incorporated by the silica particles from assuming excessive levels even in high-temperature, high-humidity environments, and can prevent a reduction in the charge quantity and makes it possible to maintain a stable charge quantity.

The total pore volume of the silica particle is preferably from 0.40 $cm^3/g$ to 1.20 $cm^3/g$.

The number-average particle diameter of the silica particle is from 15 nm to 60 nm and is preferably from 15 nm to 49 nm and more preferably from 15 nm to 40 nm.

Having the number-average particle diameter of the silica particles be at least 15 nm serves to inhibit the burying of the silica particles that is brought about by the stress received by the toner in the developing device and enables the maintenance of the environmental properties and durability properties.

Having the number-average particle diameter of the silica particles be not more than 60 nm prevents impairment of the triboelectric charging characteristics by the silica particles and can suppress a reduction in the charge quantity during extended use and enables the maintenance of a constant charge quantity.

The average pore diameter of the silica particles can be controlled using the temperature and pH during the reaction in a wet method for producing silica.

The total pore volume of the silica particles can be controlled using the pH and additives (for example, catalysts such as dimethylformamide and formaldehyde) during the reaction in a wet method for producing silica and can also be controlled using the maturation and drying conditions.

The silica particle content, per 100 mass parts of the toner particle, is preferably from 0.1 mass parts to 10 mass parts, more preferably from 0.2 mass parts to 5.0 mass parts, and still more preferably from 0.5 mass parts to 3.0 mass parts.

The silica particles can be exemplified by silica particles obtained by a wet method, e.g., silica particles provided by a sol-gel method and silica particles provided by a gel method, and silica particles obtained by a vapor-phase method, e.g., fumed silica particles, fused silica particles, and deflagration silica particles.

Silica particles that are a wet silica, e.g., silica particles provided by a sol-gel method and silica particles provided by a gel method, are preferred among the preceding from the standpoint of being rich in residual silanol groups and exhibiting particularly good adsorption/desorption characteristics for the retained water.

The hydrophobicity of the silica particles is preferably from 40% to 75%, more preferably from 43% to 70%, and still more preferably from 45% to 60%. When this range is satisfied, the retained water incorporated in the silica particle pores exhibits excellent adsorption/desorption characteristics, the charge quantity can be maintained to a suitable degree even in severe environments, and the development characteristics, i.e., transferability, fogging inhibition, and environmental stability, are excellent.

The silica particle hydrophobicity can be adjusted by subjecting the silica particle surface to a hydrophobic treatment.

There are no particular limitations on the treatment agent used in the hydrophobic treatment, and heretofore known silanes and silazane compounds can be used. Specific examples are as follows:

dimethyldisilazane, hexamethyldisilazane, methyltrimethoxysilane, octyltrimethoxysilane, isobutyltrimethoxysilane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, dimethyldimethoxysilane, diphenyldiethoxysilane, 1-hexamethyldisiloxane, 1,3-divinyltetramethyldisiloxane, 1,3-diphenyltetramethyldisiloxane, and dimethylpolysiloxanes that have 2 to 12 siloxane units in each molecule and that have one hydroxyl group on each of the Si in the units residing at the terminals.

Silane compounds that exhibit a positive charging performance can be exemplified by 3-aminopropyltrimethoxysilane, 3-aminopropyltriethoxysilane, 3-(2-aminoethylamino) propyltrimethoxysilane, and 3-(2-aminoethylamino) propyltriethoxysilane.

A single one of the preceding may be used or a mixture of two or more may be used.

Hexamethyldisilazane is preferred among the preceding. The silica particles are preferably subjected to a surface treatment with hexamethyldisilazane. Silica particles that have been subjected to a hydrophobic treatment by a wet method using hexamethyldisilazane are more preferred because the treatment proceeds very uniformly and the environmental stability is excellent.

Treatment may also be carried out using, inter alia, silicone oil as a hydrophobic treatment agent other than the preceding, and treatment with a silicone oil may be carried out along with the aforementioned silane or silazane compound. The silicone oil can be exemplified by dimethylsilicone oils, methylphenylsilicone oils, α-methylstyrene-modified silicone oils, chlorophenylsilicone oils, and fluorine-modified silicone oils.

The following methods are examples of methods for carrying out a silicone oil treatment: directly mixing, using a mixer such as a Henschel mixer, the silicone oil with the silica particles or with silica particles that have been treated with a silane coupling agent; spraying the silicone oil on the silica particles that form the base. In a preferred method, the silicone oil is dissolved or dispersed in a suitable solvent, the silica particles are then added and mixing is carried out, and the solvent is removed.

The hydrophobic treatment agent can be specifically exemplified by the following: chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane; alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, isobutyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, isobutyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl) aminopropylmethyldimethoxysilane; silazanes such as hexamethyldisilazane, hexamethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane; silicone oils such as dimethylsilicone oil, methylhydrogensilicone oil, methylphenylsilicone oil, alkyl-modified silicone oil, chloroalkyl-modified silicone oil; chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal-reactive silicone oil; siloxanes such as hexamethylcyclotrisiloxane, octamethylcyclotetrasiloxane, decamethylcyclopentasiloxane, hexamethyldisiloxane, octamethyltrisiloxane; and, as fatty acids and their metal salts, long-chain fatty acids such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidic acid, and salts of these fatty acids with metals such as zinc, iron, magnesium, aluminum, calcium, sodium, and lithium.

Among the preceding, the hydrophobic treatment is easy to perform with the alkoxysilanes, silazanes, and straight silicone oils and their use is thus preferred. A single one of these hydrophobic treatment agents may be used by itself or two or more may be used in combination.

Through the presence at the toner particle surface of an area formed by polyester resin and an area formed by styrene-acrylic resin, the toner according to the present disclosure can exhibit a charge quantity buffering effect by triboelectric charging with the silica particles having the prescribed average pore diameter and total pore volume.

The polyester resin present at the toner particle surface is not particularly limited and known polyester resins can be used.

The polyester resin is preferably a condensation polymer between at least one polyhydric alcohol and at least one polybasic carboxylic acid.

For example, a dihydric alcohol (more specifically a diol or a bisphenol) or an at least trihydric alcohol, as shown below, can be suitably used as the alcohol for synthesizing the polyester resin. For example, a dibasic carboxylic acid or an at least tribasic carboxylic acid, or the anhydride or lower alkyl ester thereof, as shown below, can be suitably used as the carboxylic acid for synthesizing the polyester resin. The polyester resin is more preferably a condensation polymer of a dihydric alcohol and a dibasic carboxylic acid and tribasic carboxylic acid (anhydride or lower alkyl ester thereof).

Favorable examples of the diols are ethylene glycol, diethylene glycol, triethylene glycol, 1,2-propanediol, 1,3-propanediol, 1,4-butanediol, neopentyl glycol, 2-butene-1,4-diol, 1,5-pentanediol, 1,6-hexanediol, 1,4-cyclohexanedimethanol, dipropylene glycol, polyethylene glycol, polypropylene glycol, and polytetramethylene glycol.

Favorable examples of the bisphenols are bisphenol A, hydrogenated bisphenol A, bisphenol A/ethylene oxide adducts, and bisphenol A/propylene oxide adducts. The number of moles of addition for the bisphenol A/ethylene oxide adducts and bisphenol A/propylene oxide adducts is preferably 1.0 moles to 10.0 moles and more preferably 1.0 moles to 4.0 moles.

Favorable examples of the at least trihydric alcohols are sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, digylcerol, 2-methylpropanethiol, 2-methyl-1,2,4-butanetriol, trimethylolethane, trimethylolpropane, and 1,3,5-trihydroxymethylbenzene.

Favorable examples of the dibasic acid are maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, allylsuccinic acid (and more specifically n-butylsuccinic acid, isobutylsuccinic acid, n-octylsuccinic acid, n-dodecylsuccinic acid, isododecylsuccinic acid, and so forth), and alkenylsuccinic acid (more specifically, n-butenylsuccinic acid, isobutenylsuccinic acid, n-octenylsuccinic acid, n-dodecenylsuccinic acid, and isododecenylsuccinic acid).

The at least tribasic carboxylic acid and anhydrides and lower alkyl esters thereof can be exemplified by 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and Empol trimer acid and the anhydrides and lower alkyl esters of the preceding.

The dihydric alcohol preferably contains a bisphenol.

The acid value of the polyester resin is preferably from 0.5 mg KOH/g to 20.0 mg KOH/g and is more preferably from 1.0 mg KOH/g to 10.0 mg KOH/g.

The glass transition temperature Tg of the polyester resin is preferably 50° C. to 70° C.

The styrene-acrylic resin present at the toner particle surface is not particularly limited and known styrene-acrylic resins can be used.

The styrene-acrylic resin is a copolymer of at least one styrenic monomer and at least one acrylic monomer. For example, the styrenic monomers and acrylic monomers indicated below can be suitably used to synthesize the styrene-acrylic resin.

Favorable examples of the styrenic monomer are styrene, alkylstyrenes (for example, α-methylstyrene, p-ethylstyrene, and 4-tert-butylstyrene), p-hydroxystyrene, m-hydroxystyrene, vinyltoluene, α-chlorostyrene, o-chlorostyrene, m-chlorostyrene, and p-chlorostyrene.

Favorable examples of the acrylic monomers are (meth) acrylic acid, alkyl (meth)acrylate esters, and hydroxyalkyl (meth)acrylate esters.

Favorable examples of the alkyl (meth)acrylate esters are methyl (meth)acrylate, ethyl (meth)acrylate, n-propyl (meth)acrylate, isopropyl (meth)acrylate, n-butyl (meth) acrylate, isobutyl (meth)acrylate, and 2-ethylhexyl (meth) acrylate.

Favorable examples of the hydroxyalkyl (meth)acrylate esters are 2-hydroxyethyl (meth)acrylate, 3-hydroxypropyl (meth)acrylate, 2-hydroxypropyl (meth)acrylate, and 4-hydroxybutyl (meth)acrylate.

The styrene-acrylic resin is preferably a copolymer of monomer comprising styrene and alkyl (meth)acrylate ester.

The percentage (St-Ac+PES surface area percentage) for the total surface area of the area formed by the styrene-acrylic resin and the area formed by the polyester resin, relative to the total surface area of the toner particle, is preferably at least 90 area % for the toner particle and is more preferably at least 95 area %. The upper limit is preferably less than or equal to 100 area %.

In addition, the percentage (St-Ac surface area percentage), at the toner particle surface, for the surface area of the area formed by the styrene-acrylic resin, relative to the total surface area of the area formed by the styrene-acrylic resin and the area formed by the polyester resin, is preferably from 40 area % to 80 area % and is more preferably from 45 area % to 75 area %.

An area formed by a component other than styrene-acrylic resin and polyester resin may also be present at the toner particle surface. The area formed by this other component is not particularly limited; however, the charge quantity buffering effect can be better expressed by having this area be not more than 10 area % of the total surface area of the toner particle.

Having the St-Ac surface area percentage be from 40 area % to 80 area % makes possible a further stabilization—regardless of the environment—of the charge quantity during extended use.

Under conditions of normal use for printing, for the toner in the developing device, as extended use progresses the silica particles present on the toner particle surface become buried in the toner particle or detach from the toner particle due to the stress received from the rubbing member and a trend is exhibited of a declining amount of the silica particles functioning at the toner particle surface.

Even with a decline in the silica particles functioning at the toner particle surface, having the St-Ac surface area percentage be at least 40 area % provides, through the operation of the charging buffering action, an excellent effect in terms of suppressing charge up even in a low-temperature, low-humidity environment.

In addition, by having the St-Ac surface area percentage be not more than 80 area %, the charging buffering action operates and can suppress the reduction in charge quantity in high-temperature, high-humidity environments.

When, on the other hand, a high print percentage image is output on a continuous basis, silica particles temporarily accumulate in the developing device, and a trend is seen wherein the amount of silica particles present at the toner particle surface increases.

Even with an increase in the silica particles functioning at the toner particle surface, having the St-Ac surface area percentage be at least 40 area % can suppress reductions in the charge quantity, and having the St-Ac surface area percentage be not more than 80 area % can suppress charge up.

The St-Ac surface area percentage can be controlled by adjusting the particle diameter and amount of addition of the resin fine particles that are attached to the toner particle surface by a wet method or external addition.

The percentage (PES surface area percentage) for the surface area of the area formed by the polyester resin, relative to the total surface area taken up by the area formed by the styrene-acrylic resin and the area formed by the polyester resin, is preferably from 20 area % to 60 area % and is more preferably from 25 area % to 55 area %.

The toner according to the present disclosure exhibits a charging buffering effect due to the difference in triboelectric charging properties, which are characteristics residing in the action of the retained water in the pores, between the porous silica particles and the polyester resin and styrene-acrylic resin, respectively, at the toner particle surface. The toner may be a negative-charging toner or a positive-charging toner.

Adjustment to positive charging or negative charging can be achieved by control via the resin composition of the toner particle surface, the addition of a charge control agent, and the surface treatment agent for the external additive.

The area formed by polyester resin and the area formed by styrene-acrylic resin must each be present on the toner particle surface in a manner clearly by itself.

The following method is a preferred embodiment: the toner particle has a core-shell structure, the core composition and the shell composition are each selected from styrene-acrylic resin and polyester resin, a complete coating by the shell is not achieved, and the presence of two areas is brought about by the exposure of a part of the core.

In specific terms, the following, for example, can be suitably used: a method in which the shell is formed by the addition to the core particle of resin fine particles having a different composition from the core particle, and/or a method in which the added resin fine particles are anchored by the additional application of mechanical impact, and/or a method in which the added resin fine particles are converted to a film by, for example, a heat treatment.

Among the preceding, a configuration in which the shell-forming resin particles are present in a state melt-adhered with each other and with the core particle is preferred because it provides an excellent charge quantity buffering effect due to a stable maintenance of the opportunity for contact between the silica particles and toner particle surface.

The core component of the core-shell structure may be polyester resin or styrene-acrylic resin, and the charge quantity buffering effect provided by friction with the silica particles is obtained as long as an exposed region of the core is present.

The toner particle preferably has a core-shell structure having a core particle and a shell formed on the surface of the core particle.

In a preferred embodiment, the core particle contains polyester resin, the shell contains styrene-acrylic resin, and an area formed by the polyester resin is present at the toner particle surface due to the exposure at the toner particle surface of a part of the polyester resin contained in the core particle. More preferably, the resin component contained in the core particle is polyester resin and the resin component contained in the shell is styrene-acrylic resin. Still more preferably, the resin component of the shell is composed of only styrene-acrylic resin.

In another preferred embodiment, the core particle contains styrene-acrylic resin, the shell contains polyester resin, and an area formed by the styrene-acrylic resin is present at the toner particle surface due to the exposure at the toner particle surface of a part of the styrene-acrylic resin contained in the core particle. More preferably, the resin component contained in the core particle is styrene-acrylic resin and the resin component contained in the shell is polyester resin. Still more preferably, the resin component of the shell is composed of only polyester resin.

A configuration in which the core particle contains polyester resin and the shell contains styrene-acrylic resin can maintain a high absolute value for the charge quantity and supports a trend of a greater increase in the environmental stability and is thus preferred.

A particle prepared by a pulverization method, suspension polymerization method, dissolution suspension method, or emulsion polymerization and aggregation method can be used as the core particle.

Among the preceding, the use for the core of a particle obtained by a pulverization method facilitates exposure of the core resin during the shell layer formation step and enables the formation of an area where the core resin is clearly present, and is thus preferred.

The shell-forming resin particles preferably have a number-average primary particle diameter of from 10 nm to 500 nm and more preferably from 20 nm to 200 nm. Resin particles with a number-average particle diameter of at least 10 nm readily form a uniform and stable area on the core particle surface. In addition, resin particles having a number-average particle diameter of not more than 500 nm make it possible to control the layer thickness of the portion formed by the resin particles to be constant without nonuniformities.

The amount of the shell, expressed per 100 mass parts of the core particle, is preferably from 0.20 mass parts to 7.00 mass parts and is more preferably from 0.50 mass parts to 2.00 mass parts.

The constituent components of the toner particle are described in the following.

The Binder Resin

The toner particle contains a binder resin.

Because an area formed by styrene-acrylic resin and an area formed by polyester resin are present at the surface of the toner particle, the toner particle preferably has styrene-acrylic resin and/or polystyrene resin as a binder resin. The toner particle may contain a resin other than the preceding as binder resin.

This other binder resin is not particularly limited, and a heretofore known binder resin can be used, for example, a vinyl resin, olefin resin, polyurethane resin, polyamide resin, and so forth.

Crosslinking Agent

A crosslinking agent may be added to the polymerization of the polymerizable monomer in order to control the molecular weight of the binder resin.

In the case of a vinyl resin, examples are aromatic divinyl compounds such as divinylbenzene and divinylnaphthalene; carboxylate esters having two double bonds, such as ethylene glycol diacrylate, ethylene glycol dimethacrylate, 1,3-butanediol dimethacrylate, and 1,6-hexanediol diacrylate; divinyl compounds such as divinylaniline, divinyl ether, divinyl sulfide, and divinyl sulfone; and compounds that have three or more vinyl groups.

An at least tribasic polycarboxylic acid or an at least trihydric polyol can be added in the case of a polyester resin.

The at least tribasic polycarboxylic acid can be exemplified by trimellitic acid, pyromellitic acid, cyclohexanetricarboxylic acids, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methylenecarboxylpropane, 1,3-dicarboxyl-2-methylmethylenecarboxylpropane, tetra(methylenecarboxyl)methane, 1,2,7,8-octanetetracarboxylic acid, and the anhydrides of the preceding.

The at least trihydric alcohols can be exemplified by sorbitol, 1,2,3,6-hexanetetrol, 1,4-sorbitan, pentaerythritol, dipentaerythritol, tripentaerythritol, sucrose, 1,2,4-butanetriol, glycerol, 2-methylpropanethiol, 2-methyl-1,2,4-butanetriol, trimethylolethane, trimethylolpropane, and 1,3,5-trihydroxymethylbenzene.

The amount of addition of the crosslinking agent is preferably from 0.001 mass parts to 10.000 mass parts per 100 mass parts of the polymerizable monomer.

Wax

The toner particle may include a wax.

Examples of the wax include petroleum waxes and derivatives thereof such as paraffin wax, microcrystalline wax and petrolatum, montan wax and derivatives thereof, hydrocarbon wax obtained by the Fischer-Tropsch process and derivatives thereof, polyolefin waxes such as polyethylene and polypropylene and derivatives thereof, natural waxes such as carnauba wax and candelilla wax and derivatives thereof, higher aliphatic alcohols, fatty acids such as stearic acid and palmitic acid, and acid amide, ester and ketone thereof, hydrogenated castor oil and derivatives thereof, vegetable waxes, animal waxes and silicone resins. A hydrocarbon wax and ester wax is preferable.

Incidentally, derivatives include oxides, block copolymers with vinyl monomers, and graft modified products. The amount of the wax is preferably from 2.0 parts by mass to 20.0 parts by mass with respect to 100 parts by mass of the binder resin or the polymerizable monomer that produces the binder resin.

Colorant

The toner may include a colorant. The colorant is not particularly limited, and known colorants can be used.

Examples of yellow pigments include yellow iron oxide and condensed azo compounds such as Navels Yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Lake, and the like, isoindolinone compounds, anthraquinone compounds, azo metal complexes, methine compounds, and allylamide compounds. Specific examples are presented hereinbelow.

C. I. Pigment Yellow 12, 13, 14, 15, 17, 62, 74, 83, 93, 94, 95, 109, 110, 111, 128, 129, 147, 155, 168, 180, 185, 193.

Examples of orange pigments are presented below.

Permanent Orange GTR, Pyrazolone Orange, Vulcan Orange, Benzidine Orange G, Indanthrene Brilliant Orange RK, and Indathrene Brilliant Orange GK.

Examples of red pigments include Indian Red, condensation azo compounds such as Permanent Red 4R, Lithol Red, Pyrazolone Red, Watching Red calcium salt, Lake Red C, Lake Red D, Brilliant Carmine 6B, Brilliant Carmine 3B, Eosin Lake, Rhodamine Lake B, Alizarin Lake and the like, diketopyrrolopyrrole compounds, anthraquinone compounds, quinacridone compounds, basic dye lake compounds, naphthol compounds, benzimidazolone compounds, thioindigo compounds, perylene compounds. Specific examples are presented hereinbelow.

C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 254.

Examples of blue pigments include copper phthalocyanine compounds and derivatives thereof such as Alkali Blue Lake, Victoria Blue Lake, Phthalocyanine Blue, metal-free Phthalocyanine Blue, partial Phthalocyanine Blue chloride, Fast Sky Blue, Indathrene Blue BG and the like, anthraquinone compounds, basic dye lake compound and the like. Specific examples are presented hereinbelow.

C. I. Pigment Blue 1, 7, 15, 15:1, 15:2, 15:3, 15:4, 60, 62, 66.

Examples of purple pigments include Fast Violet B and Methyl Violet Lake.

Examples of green pigments include Pigment Green B, Malachite Green Lake, and Final Yellow Green G. Examples of white pigments include zinc white, titanium oxide, antimony white and zinc sulfide.

Examples of black pigments include carbon black, aniline black, non-magnetic ferrites, magnetite, and those which are colored black by using the abovementioned yellow colorant, red colorant and blue colorant. These colorants can be used singly or in a mixture, or in the form of a solid solution.

The amount of the colorant is preferably from 3.0 parts by mass to 15.0 parts by mass with respect to 100.0 parts by mass of the binder resin or the polymerizable monomer that produces the binder resin.

Magnetic Body

The toner may also be used in the form of a magnetic toner, in which case a magnetic body as exemplified by the following is used:

iron oxides such as magnetite, maghemite, and ferrite, and iron oxides that contain another metal oxide; metals such as Fe, Co, and Ni and alloys of these metals with a metal such as Al, Co, Cu, Pb, Mg, Ni, Sn, Zn, Sb, Ca, Mn, Se, and Ti; and mixtures of the preceding.

Examples at a more specific level are triiron tetroxide ($Fe_3O_4$), iron(III) oxide ($\gamma$-$Fe_2O_3$), zinc iron oxide ($ZnFe_2O_4$), copper iron oxide ($CuFe_2O_4$), neodymium iron oxide ($NdFe_2O_3$), barium iron oxide ($BaFe_{12}O_{19}$), magnesium iron oxide ($MgFe_2O_4$), and manganese iron oxide ($MnFe_2O_4$). A single one of these magnetic materials may be used by itself or a mixture of two or more may be used. Fine powders of triiron tetroxide and fine powders of γ-iron(III) oxide are particularly favorable magnetic materials.

The number-average particle diameter of these magnetic bodies is preferably from 0.1 μm to 2 μm and more preferably from 0.1 μm to 0.3 μm. The magnetic characteristics upon the application of 795.8 kA/m (10 kOe) are as follows: a coercive force (Hc) from 1.6 kA/m to 12 kA/m (from 20 Oe to 150 Oe) and a saturation magnetization ($\sigma s$) from 5 $Am^2/kg$ to 200 $Am^2/kg$ and preferably from 50 $Am^2/kg$ to 100 $Am^2/kg$. The residual magnetization ($\sigma r$) is preferably from 2 $Am^2/kg$ to 20 $Am^2/kg$.

The content of the magnetic body, expressed per 100 mass parts of the binder resin, is preferably from 10 mass parts to 200 mass parts and is more preferably from 20 mass parts to 150 mass parts.

Charge Control Agent

The toner particle may contain a charge control agent. A known charge control agent may be used as this charge control agent. In particular, a charge control agent that provides a fast speed of rise in the charge quantity supports excellent retention characteristics for a suitable charge quantity and is thus preferred.

The following are examples of charge control agents that control the toner particle to negative charging:

metal compounds of aromatic carboxylic acids such as salicylic acid, alkylsalicylic acid, dialkylsalicylic acid, naphthoic acid, and dicarboxylic acids, and polymers and copolymers bearing such a metal compound of an aromatic carboxylic acid;

polymers and copolymers bearing a sulfonic acid group, sulfonate salt group, or sulfonate ester group;

metal salts and metal complexes of azo dyes and azo pigments; and boron compounds, silicon compounds, and calixarene.

The polymers and copolymers that have a sulfonate salt group or sulfonate ester group can be exemplified by the following:

homopolymers of a sulfonic acid group-containing vinyl monomer such as styrenesulfonic acid, 2-acrylamido-2-methylpropanesulfonic acid, 2-methacrylamido-2-methylpropanesulfonic acid, vinylsulfonic acid, and methacrylsulfonic acid, and copolymers of these sulfonic acid group-containing vinyl monomers with vinyl monomer as indicated in the section on the binder resin.

The following are examples of charge control agents that control the toner particle to positive charging:

quaternary ammonium salts and polymeric compounds that have a quaternary ammonium salt inside chain position; guanidine compounds; nigrosine compounds; and imidazole compounds.

Resin-type charge control agents can be exemplified by melamine resins, guanamine resins, aniline resins, urea resins, polyurethane resins, sulfonamide resins, polyimide resins, and derivatives of these resins.

A single one of these charge control agents may be incorporated or a combination of two or more may be incorporated. The amount of charge control agent addition is preferably from 0.01 mass parts to 10.0 mass parts per 100 mass parts of the binder resin.

However, a charge control agent need not be incorporated when a satisfactory charging performance can be secured for the toner.

The External Additive

In addition to the silica particles described above, the toner may contain, for example, a fluidizing agent, cleaning aid, and so forth, as so-called external additives in order to provide a satisfactory flowability, cleaning performance, and so forth.

The heretofore known external additives may be used without particular limitation as the external additive. Specific examples are inorganic fine particles, e.g., silica particles and metal oxides (more specifically, alumina, titanium oxide, magnesium oxide, zinc oxide, zinc stearate, strontium titanate, calcium titanate, barium titanate, hydrotalcite, and so forth); organic fine particles, e.g., vinyl resins, silicone resins, melamine resins, and so forth; and organic-inorganic composite fine particles.

A single one of these may be used by itself or a combination of two or more may be used.

In addition, the external additive may be subjected to a surface treatment. Treatment agents such as higher fatty acids, silicone varnishes, various modified silicone varnishes, unmodified silicone oils, various modified silicone oils, silane compounds, silane coupling agents, other organosilicon compounds, and organotitanium compounds may be used individually or in combination as the surface treatment agent.

Methods of Toner Particle Production

Methods for the production of a toner particle having a core-shell structure are described in the following using as an example a preferred embodiment in which an area formed by styrene-acrylic resin and an area formed by polyester resin are present at the toner particle surface.

Core Particle Preparation

A known procedure can be used for the method for producing the core particle of the toner, and the core particle can be produced by a suspension polymerization method, dissolution suspension method, emulsion polymerization and aggregation method, or pulverization method.

When the core particle is obtained by the suspension polymerization method, a polymerizable monomer composition is first prepared by mixing the polymerizable monomer constituting the binder resin and optionally, for example, a wax and colorant.

Droplets of the polymerizable monomer composition are then formed by preparing an aqueous medium containing a dispersion stabilizer and introducing this aqueous medium into a stirred vessel provided with a stirrer that can generate a high shear force, adding the polymerizable monomer composition to this aqueous medium, and dispersing the polymerizable monomer composition by stirring. The polymerizable monomer in the droplets of the polymerizable monomer composition is then polymerized to obtain core particles in which binder resin has been produced.

When the core particle is obtained by the dissolution suspension method, a resin solution is prepared by dissolving or dispersing the following to uniformity in an organic solvent: binder resin and other optional materials such as wax, polar resin, colorant, charge control agent, and so forth. The resulting resin solution is granulated by dispersion in an aqueous medium, and the organic solvent present in the particles provided by granulation is removed to obtain core particles having the desired particle diameter.

To obtain the core particle using the emulsion aggregation method, fine particles of the binder resin and fine particles of materials such as colorant are first dispersed and mixed in an aqueous medium that contains a dispersion stabilizer. A surfactant may also be added to the aqueous medium. This is followed by inducing aggregation to the desired core particle diameter by the addition of an aggregating agent and by carrying out melt adhesion between the resin fine particles, either after aggregation or at the same time as aggregation. Shape adjustment by heating may be carried out on an optional basis to obtain the core particle.

To obtain the core particle by the pulverization method, the binder resin is mixed with optional components, e.g., colorant, release agent, charge control agent, and so forth. The obtained mixture is then melt-kneaded. The resulting melt-kneaded material is subsequently pulverized and the resulting pulverizate is classified. This results in the production of a core particle having the desired particle diameter.

Shell Formation

A shell is then formed on the surface of the obtained core particle. A preferred example of the shell formation method is described in the following.

The core particle and a dispersion of fine particles of the resin that will form the shell are added to an aqueous medium with an adjusted pH.

The resin fine particles are attached to the surface of the core particle in the aqueous medium. In order to uniformly attach the resin fine particles to the core particle surface, the core particles are preferably highly dispersed in the aqueous medium containing the resin fine particles. The addition of surfactant and a strengthening of the stirring force are effective for this purpose.

The surfactant can be exemplified by anionic surfactants, cationic surfactants, amphoteric surfactants, and nonionic surfactants.

Specific examples here are anionic surfactants such as alkylbenzenesulfonate salts, α-olefinsulfonate salts, and phosphate esters; cationic surfactants such as amine salt types, e.g., alkylamine salts, aminoalcohol/fatty acid derivatives, polyamine/fatty acid derivatives, and imidazolines, and quaternary ammonium salt types, e.g., alkyltrimethylammonium salts, dialkyldimethylammonium salts, alkyldimethylbenzylammonium salts, pyridinium salts, alkylisoquinolinium salts, and benzethonium chloride; nonionic surfactants such as fatty acid amide derivatives and polyhydric alcohol derivatives; and amphoteric surfactants such as alanine, dodecyldi(aminoethyl)glycine, di(octylaminoethyl)glycine, and N-alkyl-N,N-dimethylammonium betaine.

A single surfactant may be used by itself or two or more may be used in combination.

The amount of addition of the shell-forming resin fine particles is an amount adjusted as appropriate so as to provide a desired coverage ratio at which the core particle is exposed.

Then, while stirring the aqueous medium containing the core particles and resin fine particles, heating is carried out at a rate from 0.1° C./minute to 3° C./minute to a temperature from 50° C. to 85° C.

In order to thoroughly effect shell formation, a holding time from 30 minutes to 8 hours is preferably established.

Immobilization of the resin fine particles on the core particle surface, or their conversion to a film by melting, progresses during the interval in which the temperature of the aqueous medium is held at a high temperature.

Either of the following may be used for shell formation: a configuration in which the resin fine particles assume a granular character and are connected two dimensionally; a film configuration provided by melting. Either of the following may be used for the state of attachment of the resin fine particles: attachment by melting of the core particle; attachment by melting of the resin fine particles.

The dispersion of the core-shell particles is then neutralized followed by cooling to normal temperature.

The cooled dispersion of core-shell particles is filtered and washed and then dried to yield a toner particle having a core-shell structure in the core particle is partially exposed.

A separate example carried out by a dry method will now be described for the shell formation method.

The shell can be formed by mixing the core particles and resin fine particles using a mixer (for example, an FM mixer (Nippon Coke & Engineering Co., Ltd.)) to induce attachment of the resin fine particles to the surface of the toner core particle.

The shell may also be subjected to a surface treatment on an optional basis using, for example, a Hybridization System (Nara Machinery Co., Ltd.), Mechanofusion System (Hosokawa Micron Corporation), Faculty (Hosokawa Micron Corporation), or Meteo Rainbow MR Type (Nippon Pneumatic Mfg. Co., Ltd.).

Methods of Toner Production

A toner can be obtained by the addition to the toner particle of the aforementioned silica particles and optionally another external additive.

The following are examples of devices that can be used for external addition: double cone mixers, V-mixers, drum mixers, Supermixer (Kawata Mfg. Co., Ltd.), FM mixer (Nippon Coke & Engineering Co., Ltd.), Nobilta (Hosokawa Micron Corporation), Hybridizer (Nara Machinery Co., Ltd.), Nauta mixer, and Mechano Hybrid.

The toner can be used as a one-component developer, but it may be also mixed with a carrier and used as a two-component developer.

As the carrier, magnetic particles composed of conventionally known materials such as metals such as iron, ferrites, magnetite and alloys of these metals with metals such as aluminum and lead can be used. Among them, ferrite particles are preferable. Further, a coated carrier obtained by coating the surface of magnetic particles with a coating agent such as a resin, a resin dispersion type carrier obtained by dispersing magnetic fine powder in a binder resin, or the like may be used as the carrier.

The volume average particle diameter of the carrier is preferably from 15 μm to 100 μm, and more preferably from 25 μm to 80 μm.

The methods for measuring the various properties are described in the following.

In order to measure the properties of the silica particles and toner particle from toner to which silica particles have been externally added, the silica particles and other external additive are separated from the toner and the measurements can then be carried out.

The silica particles and other external additive are separated by subjecting the toner to ultrasound dispersion in methanol, and standing at quiescence is carried out for 24 hours. The toner particle can be isolated by separating the sedimented toner particle from the silica particles and other external additive dispersed into the supernatant, followed by recovery, thorough washing, and drying. The silica particles and other external additive can be isolated by subjecting the supernatant to repeated centrifugal separation using a centrifugal separation procedure.

The Number-Average Primary Particle Diameter of the Silica Particles

The number-average primary particle diameter of the silica particles is measured using a "JEM-2800" transmission electron microscope (JEOL Ltd.). Observation is carried out on the toner to which the silica fine particles have been externally added, and the number-average particle diameter is determined by measuring the long diameter of the primary particles of 100 randomly selected silica particles in a visual field enlarged to a maximum of 200,000×. The observation magnification is adjusted as appropriate in accordance with the size of the silica particles.

The silica particles can be discriminated among the external additives for the toner by STEM-EDS measurement. The measurement conditions are as follows.

JEM2800 transmission electron microscope: 200 kV acceleration voltage

EDS detector: JED-2300T (JEOL Ltd., 100 $mm^2$ element area)

EDS analyzer: Noran System 7 (Thermo Fisher Scientific K.K.)

x-ray storage rate: 10000 to 15000 cps deadtime: the electron dose is adjusted to provide 20% to 30% and the EDS analysis is performed (number of scans=100 or measurement time=5 min).

Hydrophobicity of the Silica Particles

The hydrophobicity of the silica particles is measured using a "WET-100P" powder wettability tester from Rhesca Co., Ltd.

A fluororesin-coated spindle-shaped stirring bar having a length of 25 mm and a maximum diameter of 8 mm is introduced into a cylindrical glass container having a thickness of 1.75 mm and a diameter of 5 cm. Into this cylindrical glass container is introduced 70 mL of aqueous methanol composed of 50 volume % methanol and 50 volume % water, followed by the addition of 0.5 g of silica particles and placement in the powder wettability tester.

While stirring at a rotation rate of 3.3 rotations per second using a magnetic stirrer, methanol is added to the liquid through the powder wettability tester at a rate of 0.8 mL/minute. The transmittance of light with a wavelength of 780 nm is measured, and the hydrophobicity is taken to be the value represented by the volume percentage of methanol (=(volume of methanol/volume of mixture)×100) when the transmittance has reached 50%. The initial volume ratio between the methanol and water is adjusted as appropriate in correspondence to the hydrophobicity of the sample.

Average Pore Diameter and Total Pore Volume of the Silica Particles

Using a Tristar 3000 (Shimadzu Corporation) pore size distribution analyzer, the average pore diameter and total pore volume of the silica particles are measured by a gas adsorption method in which nitrogen gas is adsorbed to the sample surface. The measurement method follows the operation manual published by Shimadzu Corporation.

Approximately 0.5 g of the sample is first introduced into the sample tube and a vacuum is applied for 24 hours at 100° C. After application of the vacuum has been completed, the sample mass is exactly weighed to yield the sample. The total pore volume in the pore diameter range from 1.7 nm to 300.0 nm and the average pore diameter can be determined by the BJH method using the resulting sample and the aforementioned pore size distribution analyzer. The value of the true density measured using an AccuPyc 1330 dry pycnometer (Shimadzu Corporation) is used for the density required for the measurement.

Identification of the Area Formed by Polyester Resin and Area Formed by Styrene-Acrylic Resin, and Percentage for the Total Surface Area of the Area Formed by Styrene-Acrylic Resin and Area Formed by Polyester Resin Relative to the Total Surface Area of the Toner Particle The St-Ac+PES surface area percentage can be determined by staining the toner particle with ruthenium and analyzing the observed image of the stained toner particle using a scanning electron microscope.

A "JSM-7800F" scanning electron microscope (JEOL Ltd.) was used and the backscattered electron image of the stained toner particle was analyzed.

The ease of staining with ruthenium varies with the type of resin. For example, the progression rate in ruthenium staining varies substantially between polyester resin and styrene-acrylic resin. Due to this, a difference in brightness between an area formed by polyester resin and an area formed by styrene-acrylic resin is produced in the backscattered electron image of the resulting toner particle surface, thus making it possible to discriminate between an area formed by polyester resin and an area formed by styrene-acrylic resin.

For image analysis, a binarized image is obtained using image analysis software ("WinROOF", Mitani Corporation) by carrying out a binarization process based on the brightness of each pixel. The following are calculated using the obtained binarized image: the total surface area on the toner particle surface of area that can be assigned to styrene-acrylic resin (designated the St-Ac surface area in the following) and the total surface area on the toner particle surface of area that can be assigned to polyester resin (designated the PES surface area in the following).

An area formed by another resin can be discriminated by differences in brightness when an area formed by another resin is present on the toner particle surface in addition to the area formed by styrene-acrylic resin and area formed by polystyrene resin.

In this case, the surface area percentage taken up by the area formed by another resin, relative to the total surface area of the toner particle, can be calculated by setting a threshold for a brightness value that can be assigned to this other resin.

The percentage for the total surface area of the area formed by styrene-acrylic resin and area formed by polyester resin, relative to the total surface area of the toner particle, is determined using the formula given below.

The surface area percentage is calculated for each of 100 toner particles and the average value thereof is used.

surface area percentage (%) for the total surface area of the area formed by styrene-acrylic resin and area formed by polyester resin, relative to the total surface area of the toner particle surface="St-Ac surface area+PES surface area"/"total surface area of toner particle surface"×100

When the resin present at the toner particle surface is composed of only styrene-acrylic resin and polyester resin, the surface area percentage for the total of the area formed by styrene-acrylic resin and area formed by polyester resin, relative to the total surface area of the toner particle surface, then becomes 100%.

Percentage for the Surface Area of the Area Formed by Styrene-Acrylic Resin Relative to the Total Surface Area of the Area Formed by Styrene-Acrylic Resin and Area Formed by the Polyester Resin The ruthenium staining of the toner particle and image analysis of the stained toner particle surface are carried out as described above and the St-Ac surface area percentage is calculated using the formula given below.

The surface area percentage is calculated for each of 100 toner particles and the average value thereof is used.

surface area percentage (%) for the area formed by styrene-acrylic resin relative to the total surface area of the area formed by styrene-acrylic resin and area formed by polyester resin="St-Ac surface area"/"St-Ac surface area+PES surface area"×100

Measurement of Particle Diameter of Toner Particles

The particle diameter of the toner particles can be measured by a fine pore electric resistance method. For example, the measurement and calculation can be performed using "Coulter Counter Multisizer 3" and the dedicated software "Beckman Coulter Multisizer 3 Version 3.51" (manufactured by Beckman Coulter, Inc.).

A precision particle size distribution measuring apparatus (registered trademark, "Coulter Counter Multisizer 3", manufactured by Beckman Coulter, Inc.) based on a pore electric resistance method and the dedicated software "Beckman Coulter Multisizer 3 Version 3.51" (manufactured by Beckman Coulter, Inc.) are used. The measurement is performed using an aperture diameter of 100 μm with 25,000 effective measurement channels, and the measurement data are analyzed and calculated.

A solution prepared by dissolving special grade sodium chloride in ion exchanged water to a concentration of about 1% by mass, for example, "ISOTON II" (trade name) manufactured by Beckman Coulter, Inc., can be used as the electrolytic aqueous solution to be used for measurements.

The dedicated software is set up in the following manner before the measurement and analysis.

The total count number in a control mode is set to 50,000 particles on a "CHANGE STANDARD MEASUREMENT METHOD (SOM) SCREEN" of the dedicated software, the number of measurements is set to 1, and a value obtained using "standard particles 10.0 μm" (manufactured by Beckman Coulter, Inc.) is set as a Kd value. The threshold and the noise level are automatically set by pressing the measurement button of the threshold/noise level. Further, the current is set to 1600 μA, the gain is set to 2, the electrolytic solution is set to ISOTON II (trade name), and "FLUSH OF APERTURE TUBE AFTER MEASUREMENT" is checked.

In the "PULSE TO PARTICLE DIAMETER CONVERSION SETTING SCREEN" of the dedicated software, the bin interval is set to a logarithmic particle diameter, the particle diameter bin is set to a 256-particle diameter bin, and a particle diameter range is set from 2 μm to 60 μm.

A specific measurement method is described hereinbelow.

(1) Approximately 200 mL of the electrolytic aqueous solution is placed in a glass 250 mL round-bottom beaker dedicated to Multisizer 3, the beaker is set in a sample stand, and stirring with a stirrer rod is carried out counterclockwise at 24 rpm. Dirt and air bubbles in the aperture tube are removed by the "FLUSH OF APERTURE" function of the dedicated software.

(2) Approximately 30 mL of the electrolytic aqueous solution is placed in a glass 100 mL flat-bottom beaker. Then, about 0.3 mL of a diluted solution obtained by 3-fold mass dilution of "CONTAMINON N" (trade name) (10% by mass aqueous solution of a neutral detergent for washing precision measuring instruments, manufactured by Wako Pure Chemical Industries, Ltd.) with ion exchanged water is added.

(3) A predetermined amount of ion exchanged water is placed in the water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees, and about 2 mL of CONTAMINON N (trade name) is added to the water tank.

(4) The beaker of (2) hereinabove is set in the beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) About 10 mg of the toner (particles) is added little by little to the electrolytic aqueous solution and dispersed therein in a state in which the electrolytic aqueous solution in the beaker of (4) hereinabove is irradiated with ultrasonic waves. Then, the ultrasonic dispersion process is further continued for 60 sec. In the ultrasonic dispersion, the water temperature in the water tank is appropriately adjusted to a temperature from 10° C. to 40° C.

(6) The electrolytic aqueous solution of (5) hereinabove in which the toner (particles) is dispersed is dropped using a pipette into the round bottom beaker of (1) hereinabove which has been set in the sample stand, and the measurement concentration is adjusted to be about 5%. Then, measurement is conducted until the number of particles to be measured reaches 50000.

(7) The measurement data are analyzed with the dedicated software provided with the apparatus, and the weight average particle diameter (D4) is calculated. The "AVERAGE DIAMETER" on the "ANALYSIS/VOLUME STATISTICAL VALUE (ARITHMETIC MEAN)" screen when the special software is set to graph/volume % is the weight average particle diameter (D4). The "AVERAGE DIAMETER" on the "ANALYSIS/NUMBER STATISTICAL VALUE (ARITHMETIC MEAN)" screen when the special software is set to graph/number % is the number average particle diameter (D1).

Method for Measuring the Acid Value of the Resins

The acid value of the resin and so on are measured as follows. The acid value is the number of milligrams of potassium hydroxide required to neutralize the acid present in 1 g of a sample. The acid value of the binder resin is measured in accordance with JIS K 0070-1992, and is specifically measured using the following procedure.

(1) Reagent Preparation

A phenolphthalein solution is obtained by dissolving 1.0 g of phenolphthalein in 90 mL of ethyl alcohol (95 volume %) and bringing to 100 mL by adding deionized water.

7 g of special-grade potassium hydroxide is dissolved in 5 mL of water and this is brought to 1 L by the addition of ethyl alcohol (95 volume %). This is introduced into an alkali-resistant container avoiding contact with, for example, carbon dioxide, and is allowed to stand for 3 days, after which time filtration is carried out to obtain a potassium hydroxide solution. The obtained potassium hydroxide solution is stored in an alkali-resistant container. The factor for this potassium hydroxide solution is determined from the amount of the potassium hydroxide solution required for neutralization when 25 mL of 0.1 mol/L hydrochloric acid is introduced into an Erlenmeyer flask, several drops of the phenolphthalein solution are added, and titration is performed using the potassium hydroxide solution. The 0.1 mol/L hydrochloric acid used is prepared in accordance with JIS K 8001-1998.

(2) Procedure (A) Main Test 2.0 g of the pulverized sample is exactly weighed into a 200-mL Erlenmeyer flask and 100 mL of a toluene/ethanol (2:1) mixed solution is added and dissolution is carried out over 5 hours. Several drops of the phenolphthalein solution are added as indicator and titration is performed using the potassium hydroxide solution. The titration endpoint is taken to be the persistence of the faint pink color of the indicator for approximately 30 seconds.

(B) Blank Test

The same titration as in the above procedure is run, but without using the sample (that is, with only the toluene/ethanol (2:1) mixed solution).

(3) The acid value is calculated by substituting the obtained results into the following formula.

$$A=[(C-B)\times f\times 5.61]/S$$

Here, A: acid value (mg KOH/g); B: amount (mL) of addition of the potassium hydroxide solution in the blank test; C: amount (mL) of addition of the potassium hydroxide solution in the main test; f: factor for the potassium hydroxide solution; and S: mass of the sample (g).

Measurement of Glass Transition Temperature (Tg) of Resin Etc.

The glass transition temperature and the melting peak temperature are measured according to ASTM D3418-82 by using a differential scanning calorimeter "Q2000" (manufactured by TA Instruments).

The melting points of indium and zinc are used for temperature correction of the device detection unit, and the melting heat of indium is used for correction of heat quantity.

Specifically, measurements are performed under the following conditions by accurately weighing 3 mg of a sample such as resin, placing the sample in an aluminum pan, and using an empty aluminum pan as a reference.

Temperature rise rate: 10° C./min

Measurement start temperature: 30° C.

Measurement end temperature: 180° C.

The measurement is performed in a measurement range of 30° C. to 100° C. at a temperature rise rate of 10° C./min. The temperature is raised to 180° C. and held for 10 min, and then the temperature is lowered to 30° C., and thereafter the temperature is raised again. In the second temperature raising process, a change in specific heat is obtained in the temperature range of 30° C. to 100° C. The intersection point of the line at the midpoint between the baselines before and after the specific heat change at this time and the differential thermal curve is taken as a glass transition temperature (Tg).

EXAMPLES

The present invention is more specifically described herebelow using examples. The present invention is not limited by the examples that follow. The number of parts in the following formulations is on a mass basis in all instances unless specifically indicated otherwise.

Silica Particle 1 Production Example

A catalyst solution was obtained by the addition with mixing of 500 parts of methanol and 70 parts of water adjusted to pH 8.3 with 10 mass % aqueous ammonia to a 1.5-L glass reactor fitted with a stirrer, dropwise addition nozzle, and thermometer.

After adjusting this alkali catalyst solution to 40° C., 100 parts of tetramethoxysilane (TMOS) and 20 parts of 1.0 mass % aqueous ammonia were simultaneously added dropwise over 60 minutes while stirring to obtain a hydrophilic silica particle dispersion.

Using an R-Fine rotary filter (Kotobuki Industrial Co., Ltd.), the resulting silica particle dispersion was then concentrated to a solids concentration of 40 mass % to obtain a concentrated silica particle dispersion.

40 parts of hexamethyldisilazane (HMDS) was added as a hydrophobic treatment agent to 250 parts of the concentrated silica particle dispersion, and a reaction was run for 2 hours at 130° C. followed by cooling and drying by spray drying to yield silica particle 1. The properties of the obtained silica particle 1 are given in Table 1.

Silica Particle 2 Production Example

Silica particle 2 was obtained by carrying out the same procedure as in the Silica Particle 1 Production Example, but changing the pH of the aqueous alkali solution added to the catalyst solution to 5.6, changing the adjusted temperature of the catalyst solution to 30° C., and carrying out the simultaneous dropwise addition over 100 minutes of 20 parts of dimethylformamide (DMF) in addition to the TMOS and 1.0 mass % aqueous ammonia that were added dropwise. The properties of the obtained silica particle 2 are given in Table 1.

Silica Particles 3 to 9 Production Example

Silica particles 3 to 9 were produced proceeding as for silica particle 1, but changing some of the silica particle 1 production conditions to the conditions given in Table 1 (production was carried out as for silica particle 2 in the examples that used DMF). The properties are given in Table 1. The pH of the water added to the catalyst solution was adjusted using 10 mass % aqueous ammonia or 10 mass % hydrochloric acid.

Silica Particle 10 Production Example

Silica particle 10 was obtained by carrying out the same procedure as in the Silica Particle 1 Production Example, but changing the hexamethyldisilazane (HMDS) added as a hydrophobic treatment agent to 3-aminopropyltrimethoxysilane (APTMS). The properties of the resulting silica particle 10 are given in Table 1.

Silica Particles 11 and 12 Production Example

Silica particles 11 and 12 were produced proceeding as for silica particle 1, but changing some of the silica particle 1 production conditions to the conditions given in Table 1 (the production of silica particle 11, which used DMF, was carried out as for silica particle 2). The properties are given in Table 1. The pH of the water added to the catalyst solution was adjusted using 10 mass % aqueous ammonia or 10 mass % hydrochloric acid.

Silica Particle 13 Production Example 100 parts of untreated fumed silica with a number-average particle diameter of 12 nm was introduced into a reactor; operating under a nitrogen atmosphere, 2 parts of water was added and 20 parts of 3-aminopropyltrimethoxysilane (APTMS) was added; and heating and stirring were carried out for 1 hour at 200° C. and the methanol was removed followed by cooling. A deagglomeration treatment was then carried out using an impingement-type deagglomerator to provide silica particle 13. The properties of the obtained silica particle 13 are given in Table 1.

Silica Particle 14 Production Example

Silica particle 14 was obtained by carrying out the same procedure as in the Silica Particle 1 Production Example, but changing the pH of the aqueous alkali solution added to the catalyst solution to 6.6, changing the adjusted temperature of the catalyst solution to 30° C., carrying out the simultaneous dropwise addition over 30 minutes of 30 parts of formaldehyde in addition to the TMOS and 1.0 mass % aqueous ammonia that were added dropwise, and changing the hexamethyldisilazane (HMDS) hydrophobic treatment agent to 3-aminopropyltrimethoxysilane (APTMS). The properties of the obtained silica particle 14 are given in Table 1.

TABLE 1

| silica | | conditions for production of silica fine particle dispersion | | | | | surface treatment step | | properties | | | |
|---|---|---|---|---|---|---|---|---|---|---|---|---|
| | | | | | | | | | average pore | total pore | number-average particle | |
| particle No. | production method | pH | additive | parts | Temp. ° C. | duration (min) | treatment agent | parts | diameter (nm) | volume ($cm^3$/g) | diameter (nm) | hydrophobicity (%) |
| 1 | sol-gel method | 8.3 | — | — | 40 | 60 | HMDS | 40 | 12.6 | 0.52 | 35 | 56 |
| 2 | sol-gel method | 5.6 | DMF | 20 | 30 | 100 | HMDS | 40 | 7.6 | 0.93 | 20 | 45 |
| 3 | sol-gel method | 7.3 | — | — | 30 | 30 | HMDS | 40 | 10.1 | 0.73 | 49 | 59 |
| 4 | sol-gel method | 4.7 | DMF | 40 | 30 | 60 | HMDS | 40 | 6.0 | 1.30 | 30 | 43 |
| 5 | sol-gel method | 8.7 | — | — | 30 | 60 | HMDS | 40 | 19.0 | 0.70 | 29 | 64 |

TABLE 1-continued

| silica particle No. | production method | conditions for production of silica fine particle dispersion: pH | additive | parts | Temp. ° C. | duration (min) | surface treatment step: treatment agent | parts | properties: average pore diameter (nm) | total pore volume ($cm^3$/g) | number-average particle diameter (nm) | hydrophobicity (%) |
|---|---|---|---|---|---|---|---|---|---|---|---|---|
| 6 | sol-gel method | 7.4 | — | — | 55 | 45 | HMDS | 40 | 10.2 | 0.21 | 39 | 64 |
| 7 | sol-gel method | 8.2 | DMF | 50 | 30 | 60 | HMDS | 40 | 12.4 | 1.48 | 31 | 56 |
| 8 | sol-gel method | 7.4 | — | — | 30 | 25 | HMDS | 40 | 10.2 | 0.72 | 59 | 61 |
| 9 | sol-gel method | 8.4 | — | — | 50 | 125 | HMDS | 40 | 15.0 | 0.30 | 16 | 50 |
| 10 | sol-gel method | 8.3 | — | — | 40 | 60 | APTMS | 40 | 12.0 | 0.50 | 35 | 53 |
| 11 | sol-gel method | 8.2 | DMF | 55 | 30 | 130 | HMDS | 40 | 12.4 | 1.60 | 14 | 56 |
| 12 | sol-gel method | 4.5 | — | — | 60 | 24 | HMDS | 40 | 5.1 | 0.15 | 64 | 54 |
| 13 | combustion method | — | — | — | — | — | APTMS | 20 | 4.0 | 0.10 | 12 | 75 |
| 14 | sol-gel method | 6.6 | formaldehyde | 30 | 30 | 30 | APTMS | 40 | 23.0 | 1.40 | 50 | 64 |

In the Table, pH indicates “pH of water added to catalyst solution”, “Temp.” indicates “temperature”, and “duration” indicates “duration of dropwise addition (min)”. The abbreviations used in the table are as follows.

HMDS: hexamethyldisilazane

APTMS: 3-aminopropyltrimethoxysilane

Polyester Resin 1 Production 47 mol-parts of terephthalic acid, 35 mol-parts of fumaric acid, 15 mol-parts of dodecenylsuccinic acid, 60 mol-parts of the 2 mol adduct of propylene oxide on bisphenol A, and 40 mol-parts of the 2 mol adduct of ethylene oxide on bisphenol A were introduced into a reactor fitted with a nitrogen introduction line, water separation tube, stirrer, and thermocouple, followed by the addition of 0.5 parts, with reference to 100 parts of the total amount of the monomer, of dibutyltin oxide as catalyst. A polycondensation was then run by quickly raising the temperature to 180° C. at normal pressure under a nitrogen atmosphere followed by distillative removal of water while heating at a rate of 10° C./hour from 180° C. to 210° C.

1 mol-part of trimellitic anhydride was added when 210° C. was reached, the interior of the reactor was reduced to 5 kPa or below, and a polycondensation was run under conditions of 210° C. and 5 kPa or below to obtain a polyester resin 1. The properties of the obtained polyester resin 1 are given in Table 2.

Polyester Resins 2 and 3 Production

Polyester resins 2 and 3 were obtained proceeding similarly, but changing the monomer composition described in the Polyester Resin 1 Production example to the monomer composition described in Table 2. The properties are given in Table 2.

Styrene-Acrylic Resin 1 Production 100.0 parts of xylene, 80.0 parts of styrene, 20.0 parts of n-butyl acrylate, 0.3 parts of hexanediol diacrylate, and 2.0 parts of Perbutyl O (10-hour half-life temperature of 72.1° C. (NOF Corporation)) were added to a reactor fitted with a reflux condenser, stirrer, thermometer, and nitrogen introduction line, and heating was carried out to 80° C. and stirring was carried out for 6 hours.

The solvent was distilled off for 6 hours with heating to 100° C. to obtain a styrene-acrylic resin 1 for use as the core resin. The glass transition point Tg of the obtained styrene-acrylic resin 1 was 60° C.

Styrene-Acrylic-Modified Polyester Resin 1 Production bisphenol A/2 mol propylene oxide adduct: 500 parts terephthalic acid: 154 parts fumaric acid: 45 parts dibutyltin oxide: 3 parts These materials were introduced into a reactor fitted with a reflux condenser, stirrer, thermometer, and nitrogen introduction line and a polycondensation reaction was run for 8 hours at a temperature of 230° C. The polycondensation reaction was continued for 1 hour at 8 kPa followed by cooling to 160° C.

10 parts of acrylic acid was then introduced at 160° C. followed by maintenance for 20 minutes with mixing and then the dropwise addition over 1 hour from an addition funnel of a mixture of the following compounds.

styrene: 315 parts n-butyl acrylate: 65 parts polymerization initiator (di-t-butyl peroxide): 9 parts An addition polymerization reaction was run for 1 hour while maintaining a temperature of 160° C. This was followed by raising the temperature to 200° C. and holding for 1 hour at 10 kPa to produce a styrene-acrylic-modified polyester resin 1 having a content of styrene-acrylic copolymer molecular chains of 35 mass %.

The glass transition point Tg of the obtained styrene-acrylic-modified polyester resin 1 was 60° C.

TABLE 2

| | | polyester resin 1 | polyester resin 2 | polyester resin 3 |
|---|---|---|---|---|
| monomer composition charged (molar ratio) | terephthalic acid | 47 | 47 | 45 |
| | fumaric acid | 35 | 37 | 40 |
| | dodecenylsuccinic acid | 15 | 15 | 15 |
| | trimellitic anhydride | 1 | 5 | 10 |
| | BPA-PO | 60 | 60 | 60 |
| | BPA-EO | 40 | 40 | 40 |

TABLE 2-continued

| | | polyester resin 1 | polyester resin 2 | polyester resin 3 |
|---|---|---|---|---|
| resin properties | acid value (mgKOH/g) | 2.5 | 14.5 | 30.8 |
| | Tg (° C.) | 59 | 60 | 62 |

The abbreviations used in the table are as follows.

BPA-PO: 2 mol propylene oxide adduct on bisphenol A

BPA-EO: 2 mol ethylene oxide adduct on bisphenol A

Core Particle 1 Production 100 parts of polyester resin 1, 5 parts of HNP-9 hydrocarbon wax (NOF Corporation, melting point=74° C.), and 5 parts of a colorant (C. I. Pigment Blue 15:3) were mixed at a rotation rate of 2500 rpm using an FM mixer (Nippon Coke & Engineering Co., Ltd.).

The resulting mixture was then melt-kneaded using a twin-screw extruder ("PCM-30", Ikegai Corporation). The resulting kneaded material was then cooled. The cooled kneaded material was subsequently pulverized using a Turbo mill (Freund-Turbo Corporation). The resulting pulverizate was classified using a classifier ("Elbow Jet EJ-LABO", Nittetsu Mining Co., Ltd.). A core particle 1 having a weight-average particle diameter (D4) of 6 μm was obtained as a result.

Core Particle 2 Production

A core particle 2 with a weight-average particle diameter (D4) of 6 μm was obtained proceeding as in Core Particle 1 Production, but changing the polyester resin 1 that was added to polyester resin 2.

Core Particle 3 Production

A core particle 3 with a weight-average particle diameter (D4) of 6 μm was obtained proceeding as in Core Particle 1 Production, but changing the polyester resin 1 that was added to polyester resin 3.

Core Particle 4 Production

A core particle 4 with a weight-average particle diameter (D4) of 6 μm was obtained proceeding as in Core Particle 1 Production, but changing the polyester resin 1 that was added to styrene-acrylic resin 1.

Core Particle 5 Production

A dispersion of core particle 5 was prepared using the emulsion polymerization and aggregation method.

Preparation of Polyester Particle Dispersion polyester resin 1 200.0 parts deionized water 500.0 parts These materials were introduced into a stainless steel vessel; heating to 95° C. and melting were carried out on a hot bath; and, while thoroughly stirring at 7800 rpm using a homogenizer (Ultra-Turrax T50, IKA), the pH was brought to above 7.0 by the addition of 0.1 mol/L sodium bicarbonate. A polyester particle dispersion was then obtained by the gradual dropwise addition of a mixed solution of 3.0 parts of sodium dodecylbenzenesulfonate and 297.0 parts of deionized water while emulsifying and dispersing.

When the particle size distribution of this polyester particle dispersion was measured using a particle size distribution analyzer (LA-920, Horiba, Ltd.), the number-average particle diameter of the contained polyester particles was 0.25 μm and coarse particles exceeding 1 μm were not observed.

Preparation of Wax Particle Dispersion deionized water 500.0 parts

Fischer-Tropsch wax (C105, Sasol Limited, melting point: 80° C.) 250.0 parts

These materials were introduced into a stainless steel vessel; heating to 95° C. and melting were carried out on a hot bath; and, while thoroughly stirring at 7800 rpm using a homogenizer (Ultra-Turrax T50, IKA), the pH was brought to above 7.0 by the addition of 0.1 N sodium bicarbonate. This was followed by the gradual dropwise addition of a mixed solution of 5.0 mass parts of sodium dodecylbenzenesulfonate and 245.0 mass parts of deionized water while emulsifying and dispersing. When the particle size distribution of the wax particles in this wax particle dispersion was measured using a particle size distribution analyzer (LA-920, Horiba, Ltd.), the number-average particle diameter of the contained wax particles was 0.35 μm and coarse particles exceeding 1 μm were not observed.

Preparation of Colorant Particle Dispersion

C. I. Pigment Blue 15:3 100.0 parts sodium dodecylbenzenesulfonate 5.0 parts deionized water 400.0 parts The preceding were mixed and were dispersed using a sand grinder mill. When the particle size distribution of the colorant particles contained in this colorant particle dispersion was measured using a particle size distribution analyzer (LA-920, Horiba, Ltd.), the number-average particle diameter of the contained colorant particles was 0.2 μm and coarse particles exceeding 1 μm were not observed.

Production of Core Particle Dispersion polyester particle dispersion 500.0 parts.

colorant particle dispersion 50.0 parts wax particle dispersion 50.0 parts sodium dodecylbenzenesulfonate 5.0 parts The polyester resin particle dispersion 1, the wax particle dispersion, and the sodium dodecylbenzenesulfonate were introduced into a reactor (flask with a 1 liter capacity, baffle equipped, anchor impeller) and were mixed to uniformity. The colorant particle dispersion was separately mixed to uniformity in a 500-mL beaker, and this was gradually added to the reactor while stirring to provide a mixed dispersion. While stirring the obtained mixed dispersion, 0.5 parts as solids of an aqueous aluminum sulfate solution was added dropwise to bring about the formation of aggregated particles.

After completion of the dropwise addition, the interior of the system was substituted using nitrogen and holding was carried out for 1 hour at 50° C. and for an additional 1 hour at 55° C.

Heating was then carried out and holding was performed for 30 minutes at 90° C. This was followed by cooling to 63° C. and then holding for 3 hours to form coalesced particles. After the prescribed time had elapsed, cooling was carried out to 40° C. at a ramp down rate of 0.5° C. per minute to obtain a core particle 5 dispersion that had a weight-average particle diameter (D4) of 6 μm.

Core Particle 6 Production

A dispersion of core particle 6 was prepared using the dissolution suspension method.

polyester resin 1 100.0 parts.

C. I. Pigment Blue 15:3 (copper phthalocyanine) 5.0 parts.

ester wax (behenyl behenate: melting point=72° C.) 15.0 parts.

methyl ethyl ketone 100.0 parts ethyl acetate 100.0 parts

These materials were dispersed for 3 hours using an attritor (Mitsui Mining & Smelting Co., Ltd.) to obtain a colorant dispersion.

Otherwise, an aqueous medium was prepared by adding 1.8 parts of tricalcium phosphate to 300.0 parts of deionized water heated to a temperature of 60° C. and stirring at a stirring rate of 10000 rpm using a TK Homomixer (Tokushu Kika Kogyo Co., Ltd.). The colorant dispersion was introduced into this aqueous medium and colorant particle granulation was performed by stirring, at a temperature of 65° C. in an $N_2$ atmosphere, for 15 minutes at a stirring rate of 12000 rpm using a TK Homomixer.

The TK Homomixer was then changed over to an ordinary propeller stirrer. The stirring rate with the stirrer was held at 150 rpm; the internal temperature was raised to a temperature of 95° C.; and the solvent was removed from the dispersion by holding for 3 hours to prepare a core particle 6 dispersion having a weight-average particle diameter (D4) of 6 μm.

Core Particle 7 Production

A core particle 7 with a weight-average particle diameter (D4) of 6 μm was obtained proceeding as in Core Particle 1 Production, but adding 0.7 parts of BONTRON P-51 (Orient Chemical Industries Co., Ltd.) charge control agent in addition to the wax and colorant that were added.

Preparation of Shell Resin Particle 1

A glass vessel equipped with a stirrer, reflux condenser, thermometer, and nitrogen introduction line was placed on a water bath and 500 parts of deionized water and 28.3 parts of Neogen RK anionic surfactant (Dai-ichi Kogyo Seiyaku Co., Ltd.) were introduced into the flask. The temperature in the flask was then raised to 80° C. This was followed by the dropwise addition over 3 hours to the 80° C. flask contents of each of two different solutions (a first solution and a second solution).

The first solution was a mixture of 84 parts of styrene and 16 parts of butyl acrylate. The second solution was a solution of 1 part of potassium persulfate dissolved in 50 parts of deionized water. The temperature in the flask was then held at 80° C. for an additional 2 hours to bring about the polymerization of the flask contents. A dispersion containing shell resin particle 1 was obtained as a result. The obtained shell resin particle 1 had a number-average primary particle diameter of 50 nm and a Tg of 70° C.

Preparation of Shell Resin Particle 2

A dispersion containing shell resin particle 2 was obtained proceeding as in the Preparation of Shell Resin Particle 1, but changing the amount of addition of the Neogen RK anionic surfactant (Dai-ichi Kogyo Seiyaku Co., Ltd.) to 16.7 parts and changing the monomer composition that was added as the first solution to 73.5 parts of styrene, 24.5 parts of butyl acrylate, and 2 parts of acrylic acid. The obtained shell resin particle 2 had a number-average primary particle diameter of 72 nm and a Tg of 61° C.

Preparation of Shell Resin Particles 3 and 4

A dispersion containing shell resin particle 3 and 4 were obtained proceeding as in the Preparation of Shell Resin Particle 1, but changing the amount of addition of the Neogen RK anionic surfactant (Dai-ichi Kogyo Seiyaku Co., Ltd.) and the monomer composition to the amounts given in Table 3. The properties of the dispersion containing shell resin particle 3 and 4 are given in Table 3.

Preparation of Shell Resin Particle 5 polyester resin 1 200 parts deionized water 500 parts

These materials were introduced into a stainless steel vessel; heating to 95° C. and melting were carried out on a hot bath; and, while thoroughly stirring at 7800 rpm using a homogenizer (Ultra-Turrax T50, IKA), the pH was brought to above 7.0 by the addition of 0.1 mol/L sodium bicarbonate. A polyester resin particle dispersion was then obtained by the gradual dropwise addition of a mixed solution of 3 parts of sodium dodecylbenzenesulfonate and 297 parts of deionized water while emulsifying and dispersing.

When the particle size distribution of this polyester resin particle dispersion was measured using a particle size distribution analyzer (LA-920, Horiba, Ltd.), the number-average particle diameter of the contained polyester resin particles was 240 nm and coarse particles exceeding 1 μm were not observed.

Preparation of Shell Resin Particle 6

A shell resin fine particle dispersion 6 was obtained proceeding as in the Preparation of Shell Resin Particle 5, but changing the polyester resin 1 that was added to the styrene-acrylic-modified polyester resin 1. The number-average particle diameter of the obtained styrene-acrylic-modified polyester resin particles was 250 nm, and coarse particles in excess of 1 μm were not observed.

TABLE 3

| shell resin particle | amount of surfactant addition (parts) | monomer composition (mass parts) St | BA | MA | AA | 2-HEMA | properties: number-average particle diameter (nm) | Tg (° C.) |
|---|---|---|---|---|---|---|---|---|
| 1 | 28.3 | 84 | 16 | — | — | — | 50 | 70 |
| 2 | 16.7 | 73.5 | 24.5 | — | 2 | — | 72 | 61 |
| 3 | 45.0 | 60 | — | 10 | — | 30 | 30 | 80 |
| 4 | 8.3 | 86 | 12 | — | 2 | — | 100 | 90 |
| 5 | polyester resin described in text | | | | | | 240 | 59 |
| 6 | styrene-acrylic-modified polyester resin described in text | | | | | | 250 | 60 |

The abbreviations used in the table are as follows.

St: styrene

BA: n-butyl acrylate

MA: methyl acrylate

AA: acrylic acid

2-HEMA: 2-hydroxyethyl methacrylate

Toner 1 Production

Formation of Core/Shell Particle

A three-neck flask fitted with a thermometer and a stirring blade was prepared and the flask was placed on a water bath. 100 parts of deionized water was introduced into the flask and the temperature in the flask was held at 30° C. using the water bath. The pH of the contents of the flask was adjusted to 4 by the addition of 10 mass % hydrochloric acid to the flask.

The previously prepared dispersion containing shell resin particle 1 was added to the flask in an amount that provided 1.00 part of the solids fraction. 100 parts of the core particle 1 that had been prepared by the previously described procedure was then added to the flask and the flask contents were thoroughly stirred. A dispersion of core particle 1 and shell resin particle 1 was obtained in the flask as a result.

An additional 100 parts of deionized water was added to the flask, and the temperature of the flask contents was raised to 50° C. at a rate of 1.0° C./minute while stirring at a rotation rate of 100 rpm.

At the point at which the temperature in the flask reached 50° C., 0.5 parts of Neogen RK anionic surfactant (Dai-ichi Kogyo Seiyaku Co., Ltd.) was added and the pH was then adjusted to 7 by the addition of sodium bicarbonate.

While stirring the flask contents at a rotation rate of 100 rpm, heating of the flask contents was continued at a rate of 1.0° C./minute to 85° C., and holding was carried out for 2 hours at 85° C. This was followed by cooling the flask contents to room temperature to obtain a dispersion that contained toner particle 1.

The resulting dispersion containing toner particle 1 was subjected to filtration (solid-liquid separation), and washing was performed by repeating redispersion using deionized water and filtration. This was followed by drying using a flash jet dryer to obtain toner particle 1.

Toner particle 1 had a core-shell structure in which a part of the core particle was exposed, and the toner particle surface was formed from an area formed by polyester resin and an area formed by styrene-acrylic resin.

The surface area percentage for the total surface area of the area formed by styrene-acrylic resin and the area formed by polyester resin, relative to the total surface area of the toner particle surface of toner particle 1, was 100 (area %), and the surface area percentage for the area formed by styrene-acrylic resin, relative to the total surface area of the area formed by styrene-acrylic resin and the area formed by polyester resin, was 60 (area %).

External Addition Step

Using a Henschel mixer (Model FM-10, Mitsui Miike Chemical Engineering Machinery Co., Ltd.), 100.0 parts of the resulting toner particle 1 was mixed with 1.0 part of silica particle 1 to obtain a negative-charging toner 1. The properties are given in Table 4.

Toner 2 Production

A negative-charging toner 2 was produced proceeding as in Toner 1 Production, but changing the amount of addition of the dispersion containing shell resin particle 1 to an amount that provided 0.75 parts of the solids fraction, and changing the silica particle 1 added in the (External Addition Step) to silica particle 2. The St-Ac+PES surface area percentage for toner particle 2 was 100 (area %), and the St-Ac surface area percentage was 50 (area %). The properties are given in Table 4.

Toners 3 to 17 and 20 to 25 Production

Toners 3 to 17 and toners 20 to 25 were produced proceeding as in Toner 1 Production, but changing, as indicated in Table 4, the type and amount of addition of the core particle and shell resin particle that were added and the silica particle added in the external addition step. The properties are given in Table 4.

The amount of addition of the core particle 5 dispersion that was added in the production of toner 15 and the amount of addition of the core particle 6 dispersion that was added in the production of toner 16 were in each case an amount that provided 100 parts of the solid fraction.

Toner 18 Production

A positive-charging toner 18 was produced proceeding as in Toner 1 Production, but with the further addition of 0.084 parts of methylolmelamine aqueous solution (Mirbane Resin SM-607, Showa Denko Kabushiki Kaisha) at the time of the addition of the dispersion containing shell resin particle 1.

The St-Ac+PES surface area percentage for toner particle 18 was 90 (area %), and the St-Ac surface area percentage was 60 (area %). The properties are given in Table 4.

Toner 19 Production

A positive-charging toner 19 was produced proceeding as in Toner 18 Production, but changing the amount of addition of the methylolmelamine aqueous solution (Mirbane Resin SM-607, Showa Denko Kabushiki Kaisha) to 0.140 parts.

The St-Ac+PES surface area percentage for toner particle 19 was 88 (area %), and the St-Ac surface area percentage was 60 (area %).

The properties are given in Table 4.

TABLE 4

| toner No. | core particle No. | core particle composition | core particle solid fraction (parts) | shell resin particle No. | shell resin particle composition | shell resin particle solids fraction (parts) | St-Ac + PES surface area percentage (area %) | St-Ac surface area percentage (area %) | silica particle No. | chargeability |
|---|---|---|---|---|---|---|---|---|---|---|
| 1 | 1 | PES | 100 | 1 | St-Ac | 1.00 | 100 | 60 | 1 | negative |
| 2 | 1 | PES | 100 | 1 | St-Ac | 0.75 | 100 | 50 | 2 | negative |
| 3 | 1 | PES | 100 | 1 | St-Ac | 1.35 | 100 | 70 | 3 | negative |
| 4 | 2 | PES | 100 | 2 | St-Ac | 1.40 | 100 | 60 | 4 | negative |
| 5 | 2 | PES | 100 | 2 | St-Ac | 1.40 | 100 | 60 | 5 | negative |
| 6 | 3 | PES | 100 | 3 | St-Ac | 0.75 | 100 | 60 | 6 | negative |
| 7 | 3 | PES | 100 | 3 | St-Ac | 0.75 | 100 | 60 | 7 | negative |
| 8 | 3 | PES | 100 | 3 | St-Ac | 0.75 | 100 | 60 | 8 | negative |
| 9 | 3 | PES | 100 | 4 | St-Ac | 2.15 | 100 | 60 | 8 | negative |
| 10 | 4 | St-Ac | 100 | 5 | PES | 5.00 | 100 | 60 | 8 | negative |
| 11 | 1 | PES | 100 | 1 | St-Ac | 0.50 | 100 | 40 | 1 | negative |
| 12 | 4 | St-Ac | 100 | 6 | St-Ac-modified PES | 10.00 | 100 | 37 | 1 | negative |
| 13 | 1 | PES | 100 | 1 | St-Ac | 1.85 | 100 | 80 | 1 | negative |
| 14 | 1 | PES | 100 | 1 | St-Ac | 2.00 | 100 | 82 | 1 | negative |
| 15 | 5 | PES | 100 | 1 | St-Ac | 1.00 | 100 | 60 | 1 | negative |
| 16 | 6 | PES | 100 | 1 | St-Ac | 1.00 | 100 | 60 | 9 | negative |
| 17 | 7 | PES | 100 | 1 | St-Ac | 1.00 | 100 | 60 | 10 | positive |
| 18 | 1 | PES | 100 | 1 | St-Ac | 1.00 | 90 | 60 | 10 | positive |

TABLE 4-continued

| toner No. | core particle No. | composition | solid fraction (parts) | shell resin particle No. | composition | solids fraction (parts) | St-Ac + PES surface area percentage (area %) | St-Ac surface area percentage (area %) | silica particle No. | chargeability |
|---|---|---|---|---|---|---|---|---|---|---|
| 19 | 1 | PES | 100 | 1 | St-Ac | 1.00 | 88 | 60 | 10 | positive |
| 20 | 1 | PES | 100 | — | — | — | 100 | 0 | 1 | negative |
| 21 | 4 | St-Ac | 100 | — | — | — | 100 | 100 | 1 | negative |
| 22 | 1 | PES | 100 | 1 | St-Ac | 0.45 | 100 | 38 | 11 | negative |
| 23 | 1 | PES | 100 | 1 | St-Ac | 0.45 | 100 | 38 | 12 | negative |
| 24 | 7 | PES | 100 | 1 | St-Ac | 2.00 | 100 | 82 | 13 | positive |
| 25 | 7 | PES | 100 | 1 | St-Ac | 2.00 | 100 | 82 | 14 | positive |

In the table, PES refers to polyester resin, St-Ac refers to styrene-acrylic resin, and St-Ac-modified PES refers to styrene-acrylic-modified polyester resin.

St-Ac+PES surface area percentage: the percentage for the total surface area of the area formed by the styrene-acrylic resin and the area formed by the polyester resin, relative to the total surface area of the toner particle St-Ac surface area percentage: the percentage, at the toner particle surface, for the surface area of the area formed by the styrene-acrylic resin, relative to the total surface area of the area formed by the styrene-acrylic resin and the area formed by the polyester resin Image Evaluations A color laser beam printer (HP LaserJet Enterprise Color M652n) from Hewlett-Packard was used as the image-forming apparatus; it was modified to have a process speed of 300 mm/sec. A Genuine HP 656X LaserJet toner cartridge (cyan) was used for the cartridge. The product toner was removed from the cartridge, followed by cleaning with an air blower and filling with 300 g of the toner to be evaluated.

The refilled toner cartridge was installed in the cyan station; dummy cartridges were installed in the other stations; and image output tests were performed as described in the following. The evaluations with the positive-charging toners (toners 17 to 19, 24, and 25) were carried out in the same manner, but changing the various potential settings to enable development with a positive-charging toner.

Measurement of Toner Charge Quantity

In order to elucidate the relationship between the results of the image output test and the toner charge quantity, the toner was removed from the developer container before and after each of the individual durability tests described in the following and the toner charge quantity was measured using the following method.

9.4 g of a carrier for use in charge quantity measurements (F81-2535, Powdertech Co., Ltd.) is weighed into a 50-mL polyethylene container. 0.6 g of the toner to be measured is then weighed into the polyethylene container holding this carrier and the container is closed with its cap. The container is subsequently placed in a shaker (Model YS-LD, YAYOI Co., Ltd.) and shaking is performed for 2 minutes using shaking conditions of 150 times per minute.

Within 1 minute after this, approximately 0.4 g of the post-shaking sample is introduced into a metal measurement container 2 having a 500-mesh screen 3 at the bottom, as shown in the FIGURE, and a metal lid 4 is applied. The mass of the entire measurement container 2 at this point is measured, and this value is designated W1 (g). The potential at an electrometer 9 at this point is designated 0 V (volt).

Suction is then drawn through a suction port 7 with a suction device 1 (the part in contact with the measurement container 2 is at least an insulator), and the pressure at a vacuum gauge 5 is brought to 2.5 kPa (±0.1 kPa) within 10 seconds by adjustment with an airflow control valve 6. The time from the measurement of W1 to the start of suction is made not more than 30 seconds. This is followed by suctioning for 3 minutes to suction off the toner particles. The potential at the electrometer 9 at this point is designated V (volt). Here, 8 is a capacitor, and the capacitance is designated C (μF).

The mass of the overall measurement container after suction is measured and the value at this point is designated W2 (g). The toner charge quantity (mC/kg) for the sample is calculated using the following formula.

$$\text{charge quantity (mC/kg)}=(C\times V)/(W1-W2)$$

The charge quantity was measured on measurement samples provided by removing the toner from the developer container before and after the durability test, which was run under a low-temperature, low-humidity environment (temperature of 15° C., humidity of 10% RH:LL environment), a high-temperature, high-humidity environment (temperature of 30° C./humidity of 80% RH:HH environment), and a normal-temperature, normal-humidity environment (temperature of 23° C., humidity of 50% RH:NN environment), see below.

In the evaluations of the positive-charging toners, the measurement was carried out in the same manner, but changing the carrier for use in charge quantity measurements from (F81-2535, Powdertech Co., Ltd.) to (F-150, Powdertech Co., Ltd.).

Halftone (HT) Image Reproducibility

Operating in a low-temperature, low-humidity environment (temperature of 15° C., humidity of 10% RH), a print-out test of a total of 30000 prints was run by repeating an intermittent operation in which a temporary stoppage was implemented after each output of two prints of an image having a print percentage of 1%.

After the completion of the print-out test, 30 h, 80 h, and C0 h original halftone images were output and each image was visually inspected and the dot reproducibility was evaluated using the criteria given below.

The 30 h with reference to the halftone image is a value that presents 256 gradations in hexadecimal format and indicates an image controlled whereby 00 h is the 1st gradation (white background region) of the 256 gradations and FFh is the 256th gradation (solid region) of the 256 gradations.

A: the dots can be reproduced with good accuracy over the entire halftone image; this is a level at which the image is uniform with no nonuniformity.

B: minor dot perturbations are observed in a portion of the halftone image, but this is a level at which density nonuniformity is not a concern.

C: dot perturbations are observed in a portion of the halftone image and density nonuniformity is seen; however, this is a level at which nonuniformity is not significant from the standpoint of a practical image.

D: dot reproducibility is poor over the entire halftone image; this is a level at which roughness and/or non-uniformity is produced.

Fogging Evaluation

Operating in a high-temperature, high-humidity environment (temperature of 30° C./humidity of 80% RH), a print-out test of a total of 30000 prints was run by repeating an intermittent operation in which a temporary stoppage was implemented after each output of two prints of an image having a print percentage of 1%.

A solid white image was output after the completion of the print-out test, and the reflectance (%) of this solid white image was measured using a “Reflectometer Model TC-6DS” (Tokyo Denshoku Co., Ltd.). The evaluation was performed using the numerical value (%) provided by subtracting this reflectance from the reflectance (%) measured in the same manner on the virgin print-out paper (standard gloss paper).

Smaller numerical values are indicative of a better inhibition of image fogging. The solid white image was output using glossy paper (HP Brochure Paper 200 g, Glossy, 200 g/$m^2$, from Hewlett-Packard) in glossy paper mode.

Evaluation Criteria

A: the numerical value of the difference is less than 0.5%

B: the numerical value of the difference is at least 0.5% to less than 1.5%

C: the numerical value of the difference is at least 1.5% to less than 3.0%

D: the numerical value of the difference is greater than or equal to 3.0%

Image Density and Image Density Stability

A print-out test for a total of 10000 prints was carried out in a normal-temperature, normal-humidity environment (temperature of 23° C., humidity of 50% RH) as follows: 5000 prints of an image with a print percentage of 1% were continuously output, followed by the continuous output of 5000 prints of a high-print percentage image having a print percentage of 25%.

At both the start and after the finish of the print-out test, a sample image having a 20-mm square solid black image printed at the four corners and center of the paper surface was output on GF-0081 (81.4 g/$m^2$, Canon Marketing Japan Inc.). The reflection density was measured using an X-Rite 500 Series (Videojet X-Rite K. K.) and the average value of the image densities at the five locations was calculated.

The criteria for evaluating the image density are as follows.

A: both the starting image density and the post-durability-test image density are 1.40±less than 0.10

B: both the starting image density and the post-durability-test image density are 1.40±at least 0.10 and less than 0.15

C: both the starting image density and the post-durability-test image density are 1.40±at least 0.15 and less than 0.20

D: both the starting image density and the post-durability-test image density are 1.40±at least 0.20

The criteria for evaluating the image density stability are as follows.

A: the absolute difference between the starting image density and the post-durability-test image density is less than 0.10

B: the absolute difference between the starting image density and the post-durability-test image density is at least 0.10 and less than 0.15

C: the absolute difference between the starting image density and the post-durability-test image density is at least 0.15 and less than 0.20

D: the absolute difference between the starting image density and the post-durability-test image density is at least 0.20

Examples 1 to 19

The evaluations indicated above were performed in Examples 1 to 19 respectively using each of toners 1 to 19 for the toner. The results of the evaluations are given in Tables 5-1 and 5-2.

Comparative Examples 1 to 6

The evaluations indicated above were performed in Comparative Examples 1 to 6 respectively using each of toners 20 to 25 for the toner. The results of the evaluations are given in Tables 5-1 and 5-2.

TABLE 5-1

| | | LL environment | | | HH environment | | |
|---|---|---|---|---|---|---|---|
| Example No. | toner No. | initial charge quantity | charge quantity after durability test | HT image reproducibility | initial charge quantity | charge quantity after durability test | fogging |
| 1 | 1 | −22 | −23 | A | −21 | −20 | A |
| 2 | 2 | −25 | −26 | A | −24 | −22 | A |
| 3 | 3 | −21 | −20 | A | −20 | −17 | B |
| 4 | 4 | −25 | −27 | B | −24 | −25 | A |
| 5 | 5 | −22 | −25 | A | −21 | −17 | B |
| 6 | 6 | −23 | −27 | B | −22 | −26 | B |
| 7 | 7 | −20 | −18 | A | −19 | −15 | B |
| 8 | 8 | −19 | −18 | A | −18 | −16 | B |
| 9 | 9 | −19 | −25 | B | −17 | −14 | C |
| 10 | 10 | −18 | −19 | A | −17 | −16 | B |
| 11 | 11 | −22 | −27 | B | −19 | −22 | A |
| 12 | 12 | −23 | −31 | C | −19 | −24 | B |
| 13 | 13 | −22 | −17 | B | −21 | −16 | B |
| 14 | 14 | 22 | −15 | C | −21 | −13 | C |

TABLE 5-1-continued

| | | LL environment | | | HH environment | | |
|---|---|---|---|---|---|---|---|
| Example No. | toner No. | initial charge quantity | charge quantity after durability test | HT image reproducibility | initial charge quantity | charge quantity after durability test | fogging |
| 15 | 15 | −23 | −25 | A | −22 | −20 | A |
| 16 | 16 | −25 | −28 | B | −23 | −18 | A |
| 17 | 17 | 21 | 20 | A | 19 | 18 | A |
| 18 | 18 | 23 | 27 | B | 20 | 16 | B |
| 19 | 19 | 24 | 31 | C | 19 | 16 | B |
| C.E. 1 | 20 | −25 | −36 | D | −20 | −27 | C |
| C.E. 2 | 21 | −22 | −12 | D | −21 | −11 | D |
| C.E. 3 | 22 | −26 | −37 | D | −19 | −9 | D |
| C.E. 4 | 23 | −20 | −16 | B | −18 | −12 | D |
| C.E. 5 | 24 | 21 | 36 | D | 19 | 28 | C |
| C.E. 6 | 25 | 25 | 35 | D | 18 | 9 | D |

TABLE 5-2

| | | NN environment | | | | | | |
|---|---|---|---|---|---|---|---|---|
| Example No. | toner No | initial charge quantity | charge quantity after durability test | initial density | density after durability test | density difference | image density | image density stability |
| 1 | 1 | −22 | −21 | 1.40 | 1.39 | 0.01 | A | A |
| 2 | 2 | −25 | −24 | 1.37 | 1.38 | 0.01 | A | A |
| 3 | 3 | −20 | −23 | 1.42 | 1.35 | 0.07 | A | A |
| 4 | 4 | −25 | −23 | 1.35 | 1.40 | 0.05 | A | A |
| 5 | 5 | −22 | −22 | 1.40 | 1.42 | 0.02 | A | A |
| 6 | 6 | −23 | −20 | 1.39 | 1.32 | 0.07 | A | A |
| 7 | 7 | −19 | −16 | 1.45 | 1.52 | 0.07 | B | A |
| 8 | 8 | −19 | −18 | 1.44 | 1.48 | 0.04 | A | A |
| 9 | 9 | −19 | −16 | 1.45 | 1.52 | 0.07 | B | A |
| 10 | 10 | −18 | −17 | 1.47 | 1.51 | 0.04 | B | A |
| 11 | 11 | −21 | −16 | 1.41 | 1.54 | 0.13 | B | B |
| 12 | 12 | −22 | −14 | 1.40 | 1.58 | 0.18 | C | C |
| 13 | 13 | −22 | −27 | 1.40 | 1.27 | 0.13 | B | B |
| 14 | 14 | −22 | −30 | 1.40 | 1.21 | 0.19 | C | C |
| 15 | 15 | −23 | −21 | 1.38 | 1.43 | 0.05 | A | A |
| 16 | 16 | −24 | −21 | 1.36 | 1.44 | 0.08 | A | A |
| 17 | 17 | 20 | 21 | 1.43 | 1.40 | 0.03 | A | A |
| 18 | 18 | 23 | 19 | 1.38 | 1.50 | 0.12 | B | B |
| 19 | 19 | 24 | 17 | 1.36 | 1.53 | 0.17 | B | C |
| C.E. 1 | 20 | −24 | −14 | 1.35 | 1.58 | 0.23 | C | D |
| C.E. 2 | 21 | −22 | −32 | 1.40 | 1.18 | 0.22 | D | D |
| C.E. 3 | 22 | −25 | −14 | 1.35 | 1.59 | 0.24 | C | D |
| C.E. 4 | 23 | −19 | −14 | 1.45 | 1.58 | 0.13 | C | B |
| C.E. 5 | 24 | 20 | 15 | 1.42 | 1.56 | 0.14 | C | B |
| C.E. 6 | 25 | 20 | 14 | 1.42 | 1.57 | 0.15 | C | C |

In the Tables 5-1 and 5-2, "C.E." denotes Comparative Example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-152278, filed Sep. 10, 2020, which is hereby incorporated by reference herein in its entirety.

What is claimed is:

1. A toner, comprising:

a toner particle having a core-shell structure comprising a core particle, and a shell formed on a surface of the core particle;

the core particle comprising a resin component, with the only resin in the core particle being polyester resin;

the shell comprising a styrene-acrylic resin component;

a silica particle on a surface of the toner particle, the silica particle having a number-average particle diameter of 15 to 40 nm, an average pore diameter of 7.0 to 15.0 nm and a total pore volume of 0.40 to 1.20 $cm^3/g$; and the toner particle surface has an area formed by a polyester resin and an area formed by a styrene-acrylic resin, the area formed by the polyester resin on the toner particle surface being provided by exposing part of the polyester resin contained in the core particle, wherein a total surface area of the area formed by the styrene-acrylic resin and the area formed by the polyester resin is at least 95 area % relative to a total surface area of the toner particle, and the surface area formed by the styrene-acrylic resin is 45 to 75 area % relative to the total surface area formed by the styrene-acrylic resin and the polyester resin.

2. The toner according to claim 1, wherein the silica particle is wet silica.

3. The toner according to claim 1, wherein the silica particle has a hydrophobicity of 40 to 75%.

4. The toner according to claim 1, wherein the surface area formed by the styrene-acrylic resin is 50 to 75 area % relative to the total surface area formed by the styrene-acrylic resin and the polyester resin.

5. The toner according to claim 3, wherein the surface area formed by the styrene-acrylic resin is 50 to 75 area % relative to the total surface area formed by the styrene-acrylic resin and the polyester resin.

* * * * *